(12) United States Patent
Maruyama et al.

(10) Patent No.: US 11,595,209 B2
(45) Date of Patent: Feb. 28, 2023

(54) INFORMATION PROCESSING SYSTEM, INFORMATION PROCESSING METHOD, AND INFORMATION PROCESSING APPARATUS

(71) Applicant: SONY CORPORATION, Tokyo (JP)

(72) Inventors: Shinya Maruyama, Kanagawa (JP); Atsushi Uchida, Tokyo (JP)

(73) Assignee: SONY CORPORATION, Tokyo (JP)

(*) Notice: Subject to any disclaimer, the term of this patent is extended or adjusted under 35 U.S.C. 154(b) by 123 days.

(21) Appl. No.: 16/972,207

(22) PCT Filed: May 22, 2019

(86) PCT No.: PCT/JP2019/020337
§ 371 (c)(1),
(2) Date: Dec. 4, 2020

(87) PCT Pub. No.: WO2020/003821
PCT Pub. Date: Jan. 2, 2020

(65) Prior Publication Data
US 2021/0234684 A1 Jul. 29, 2021

(30) Foreign Application Priority Data
Jun. 29, 2018 (JP) .............................. JP2018-124568

(51) Int. Cl.
*H04L 9/32* (2006.01)
*H04L 9/14* (2006.01)
(Continued)

(52) U.S. Cl.
CPC ................ *H04L 9/14* (2013.01); *H04L 9/008* (2013.01); *H04L 9/0838* (2013.01); *H04L 9/0894* (2013.01); *H04L 9/3236* (2013.01)

(58) Field of Classification Search
CPC ... H04L 9/14; H04L 9/08; H04L 9/008; H04L 9/0894; H04L 9/0819; H04L 9/32;
(Continued)

(56) References Cited

U.S. PATENT DOCUMENTS 6,785,810 B1* 8/2004 Lirov .................. G06F 21/6245
707/999.009
2013/0275752 A1* 10/2013 Zhang ..................... H04L 9/008
713/167

(Continued)

FOREIGN PATENT DOCUMENTS

JP 2013-026954 A 2/2013
JP 2014-060614 A 4/2014
(Continued)

OTHER PUBLICATIONS

Seito et al., Information leakage countermeasures using high-performance encryption, Latest trends in "encryption state processing technology", Oct. 2014, pp. 97-132.

*Primary Examiner* — Shaqueal D Wade-Wright
(74) *Attorney, Agent, or Firm* — Paratas Law Group, PLLC

(57) ABSTRACT

There is provided an information processing system including: a first apparatus (10a) that divides a user key (UK) of a share-source user through a secret distribution process to generate a plurality of distribution keys (S1 and S2); a second apparatus (10b) that sends a processing request to execute a predetermined process by using one of a plurality of the distribution keys generated by the first apparatus; and a third apparatus (20) that makes a determination based on one of a plurality of the distribution keys generated by the first apparatus and the processing request received from the second apparatus.

20 Claims, 18 Drawing Sheets

(51) Int. Cl.
*H04L 9/00* (2022.01)
*H04L 9/08* (2006.01)

(58) Field of Classification Search
CPC ... H04L 9/3236; H04L 9/3247; H04L 9/3297; H04L 63/062; H04L 63/064; H04L 63/10; G06F 21/62; G06F 21/6218; G06F 21/6227; G06F 21/6209
See application file for complete search history.

(56) References Cited

U.S. PATENT DOCUMENTS

| | | | |
|---|---|---|---|
| 2016/0217294 A1* | 7/2016 | Hornquist Astrand | ............ H04L 63/06 |
| 2018/0101842 A1* | 4/2018 | Ventura | ............ H04L 9/0841 |
| 2020/0084037 A1* | 3/2020 | Zhang | ............ H04L 9/0819 |
| 2022/0014365 A1* | 1/2022 | Sofia | ............ H04L 9/0891 |

FOREIGN PATENT DOCUMENTS

| | | |
|---|---|---|
| JP | 2015-135541 A | 7/2015 |
| JP | 2018-097034 A | 6/2018 |

* cited by examiner

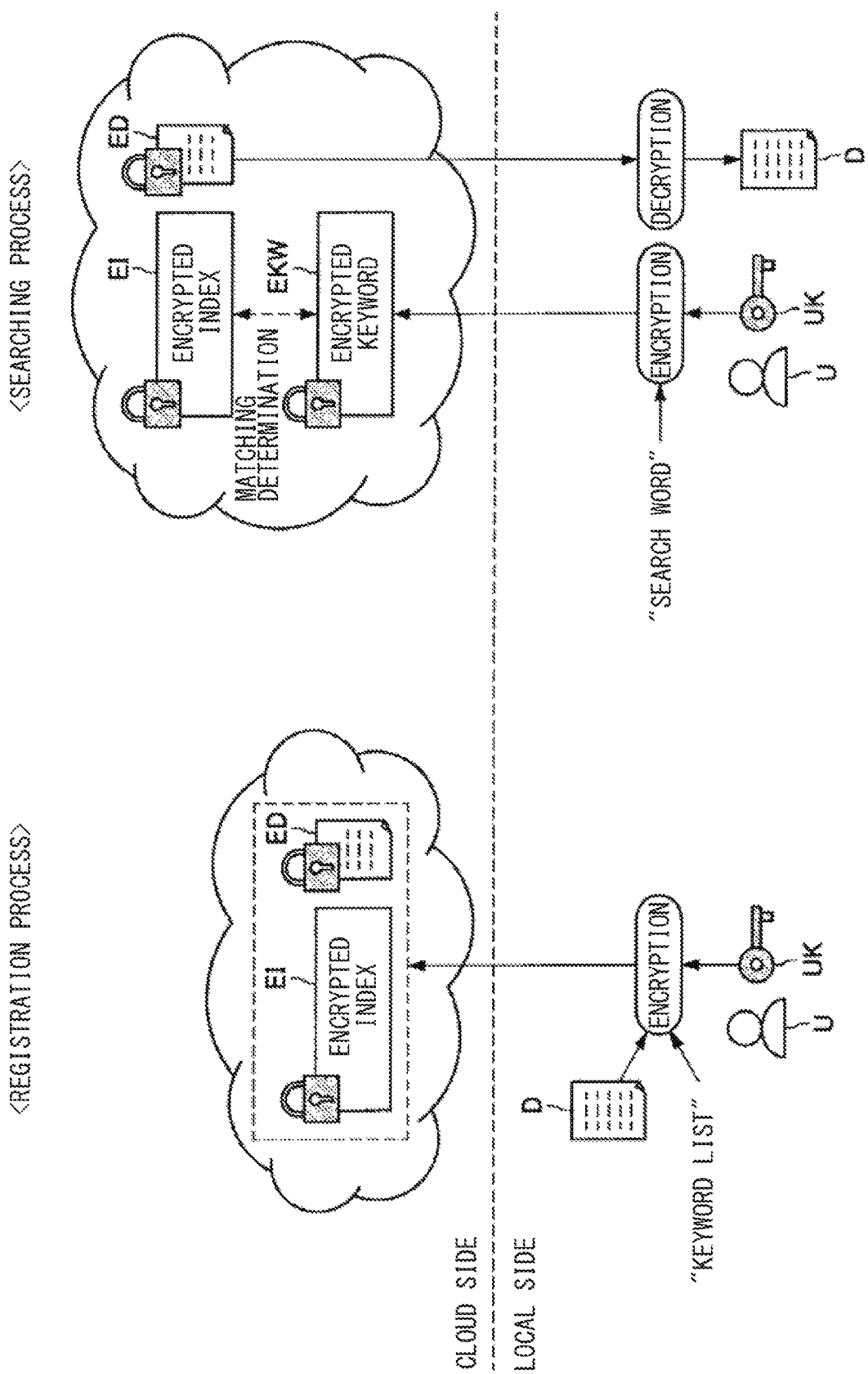
[FIG. 1]

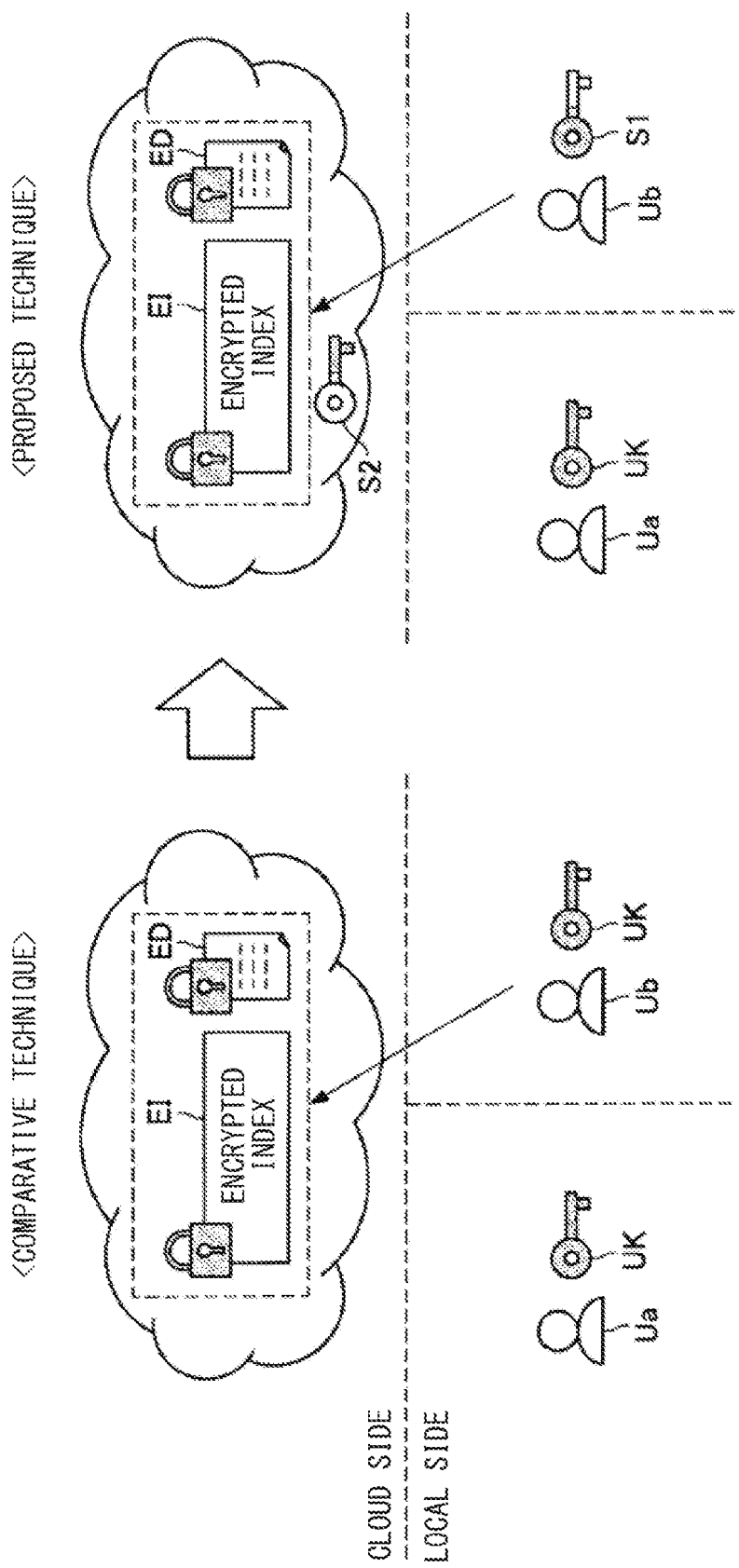

[ FIG. 3 ]
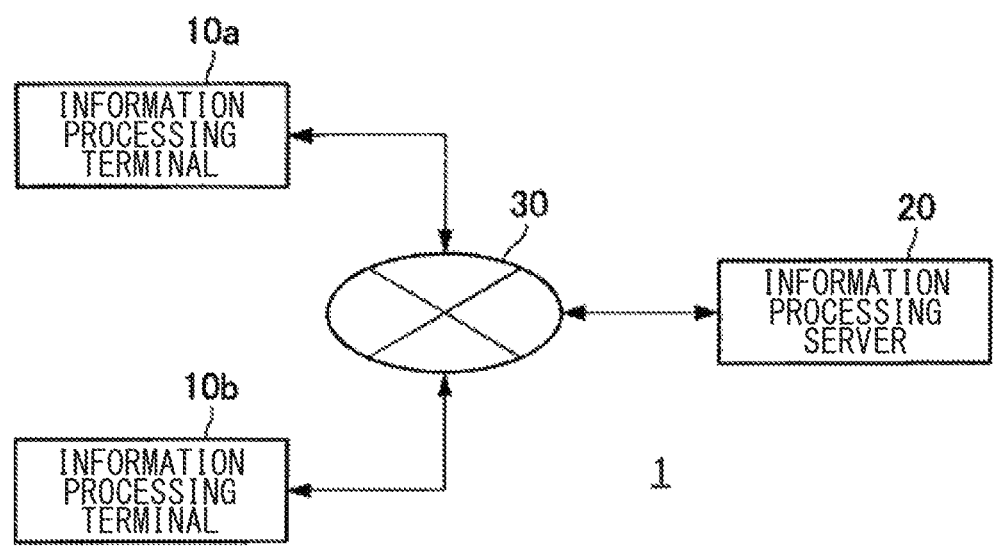

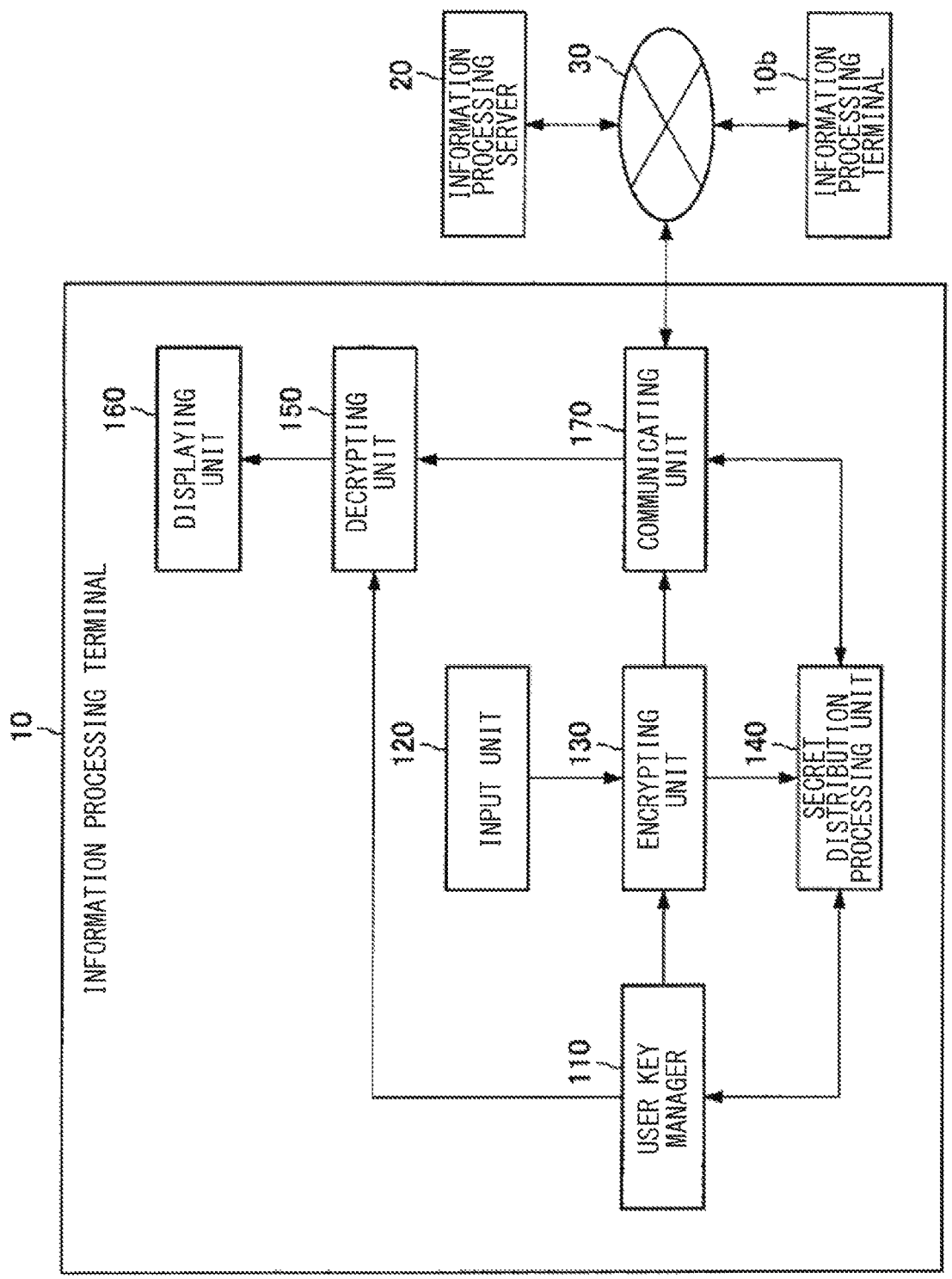
[FIG. 4]

[FIG. 5]
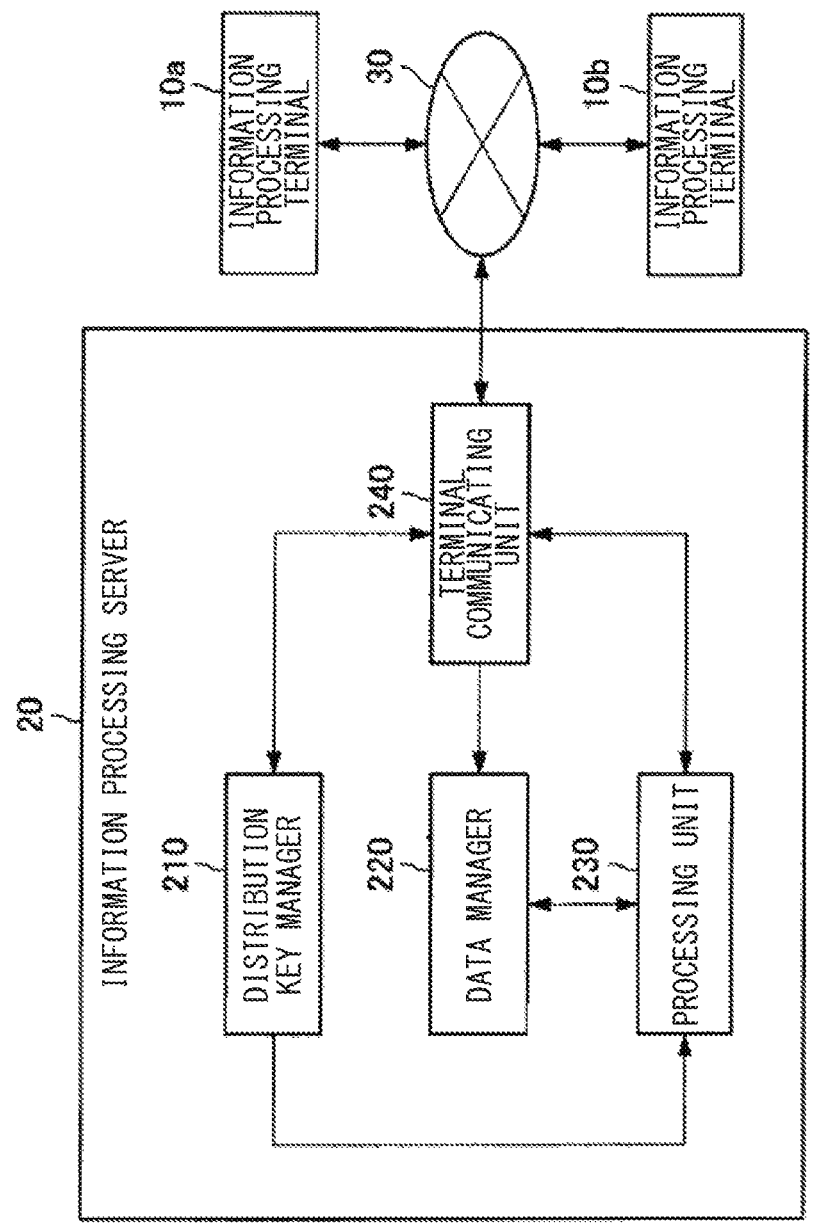

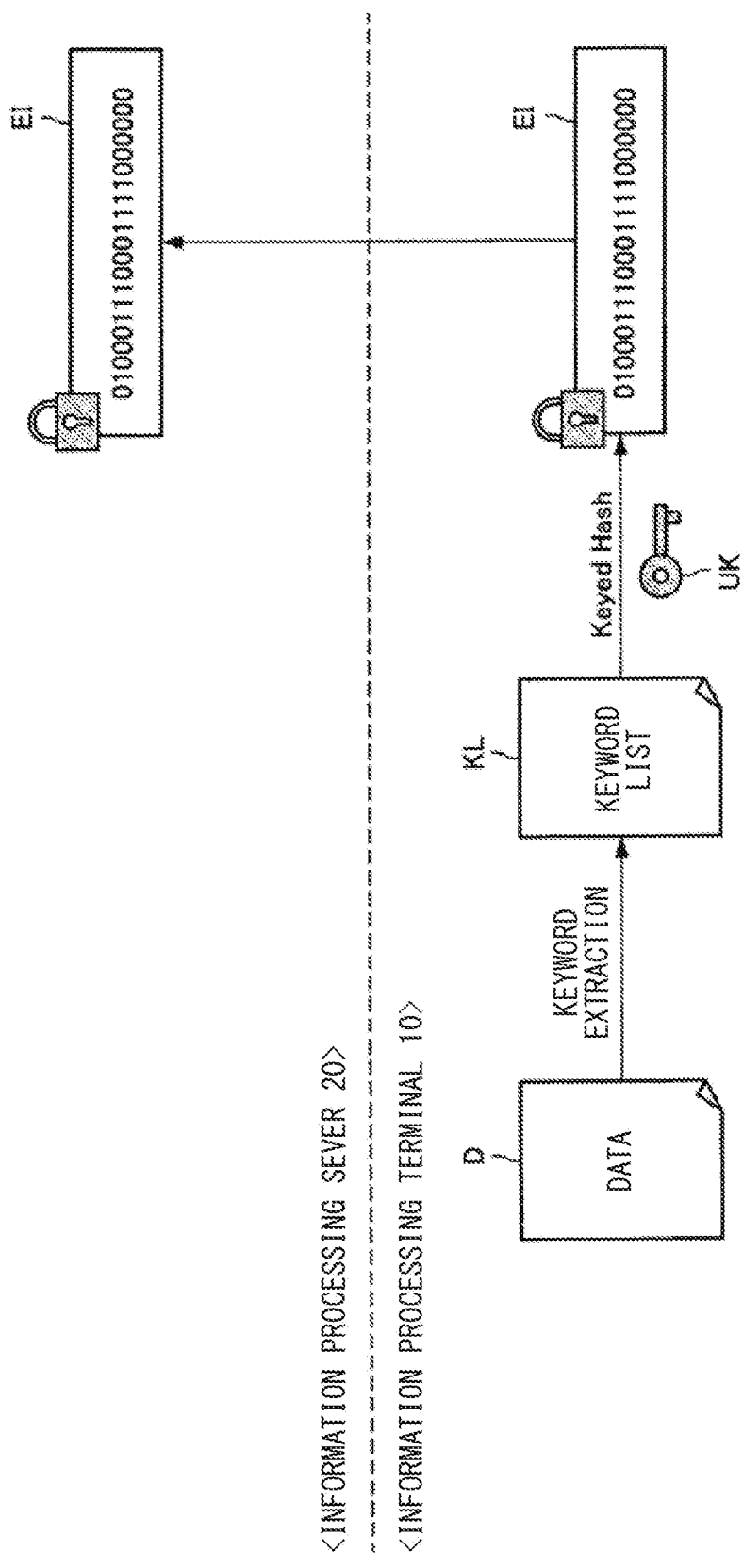

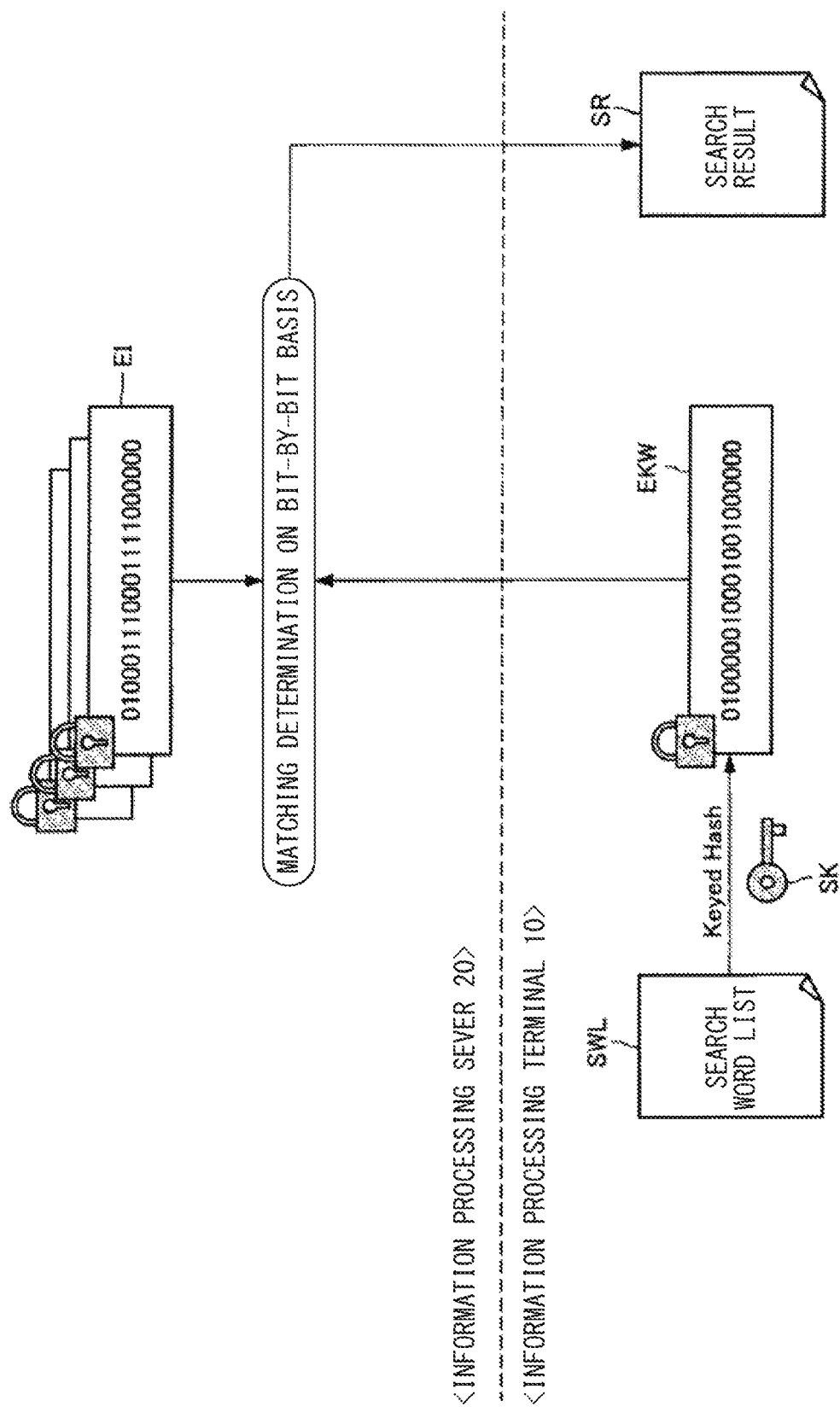

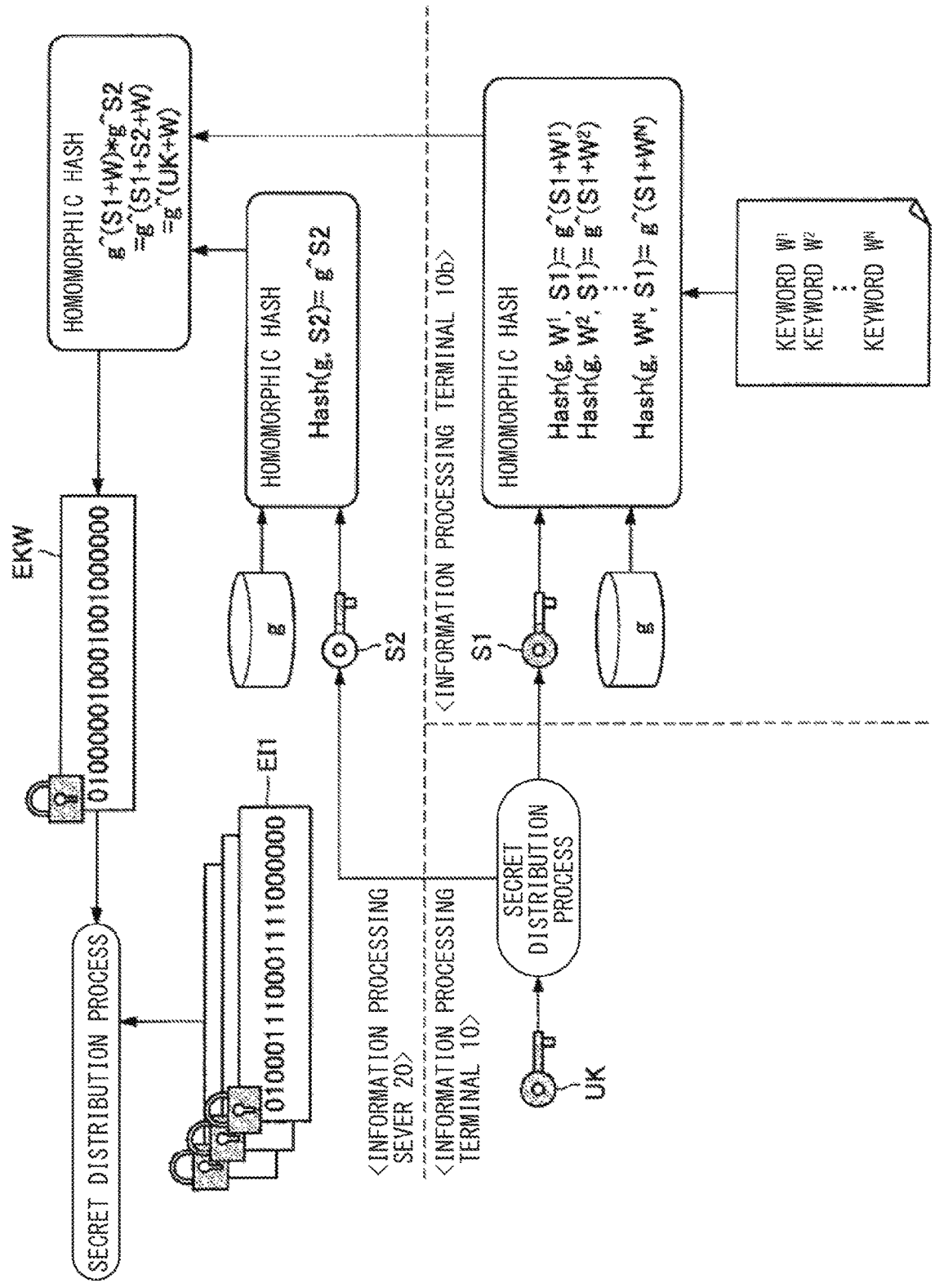
[FIG. 8]

[FIG. 9]

| DISTRIBUTION KEY ID | SHARE-TARGET USER ID | SHARE-SOURCE USER ID | DISTRIBUTION KEY |
|---|---|---|---|
| 1 | USER ID$^A$ | USER ID$^A$ | DISTRIBUTION KEY$^{AA}$ |
| 2 | USER ID$^A$ | USER ID$^B$ | DISTRIBUTION KEY$^{AB}$ |
| 3 | USER ID$^A$ | USER ID$^C$ | DISTRIBUTION KEY$^{AC}$ |
| 4 | USER ID$^B$ | USER ID$^B$ | DISTRIBUTION KEY$^{BB}$ |
| 5 | USER ID$^B$ | USER ID$^A$ | DISTRIBUTION KEY$^{BA}$ |
| 6 | USER ID$^B$ | USER ID$^D$ | DISTRIBUTION KEY$^{BD}$ |

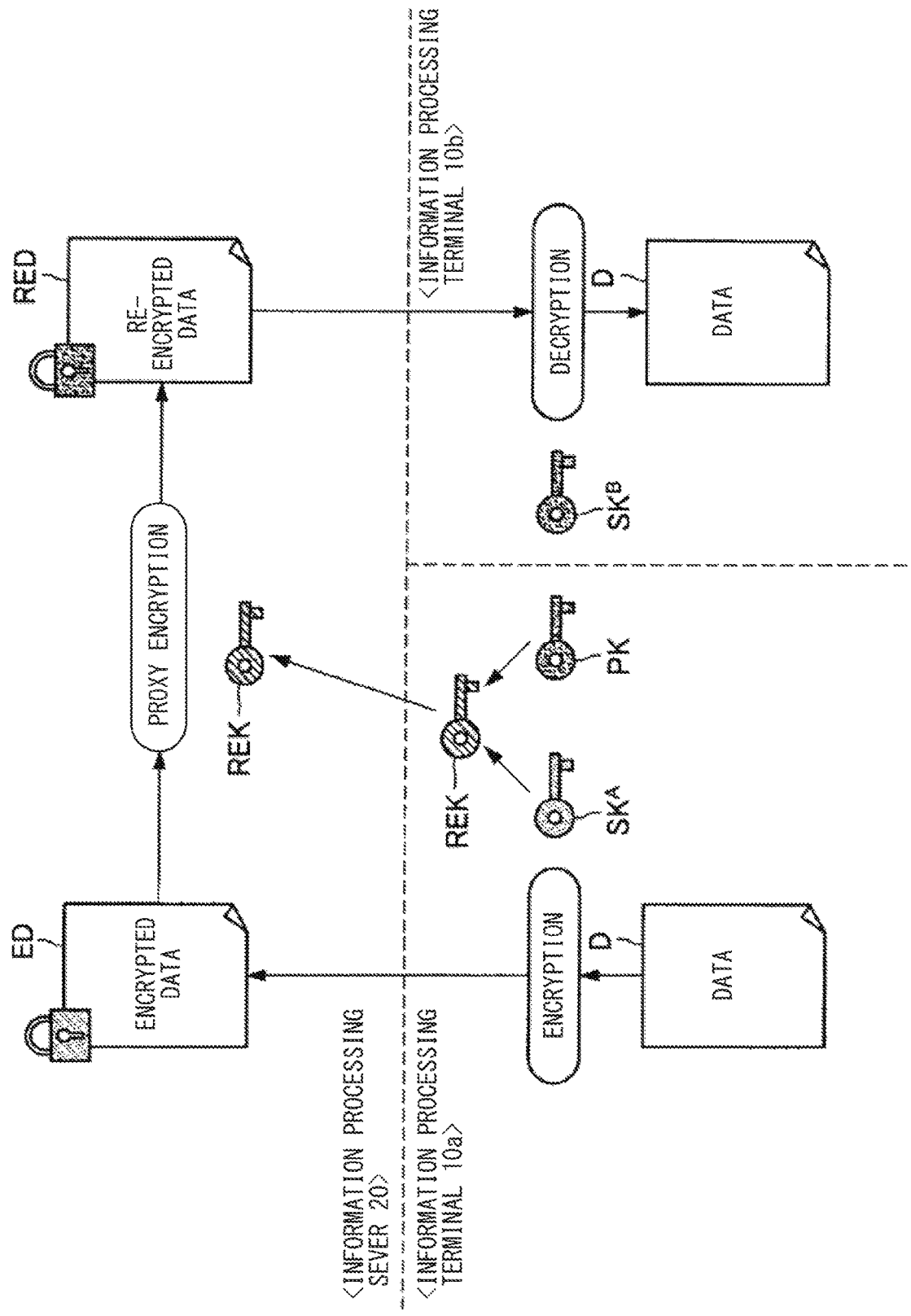

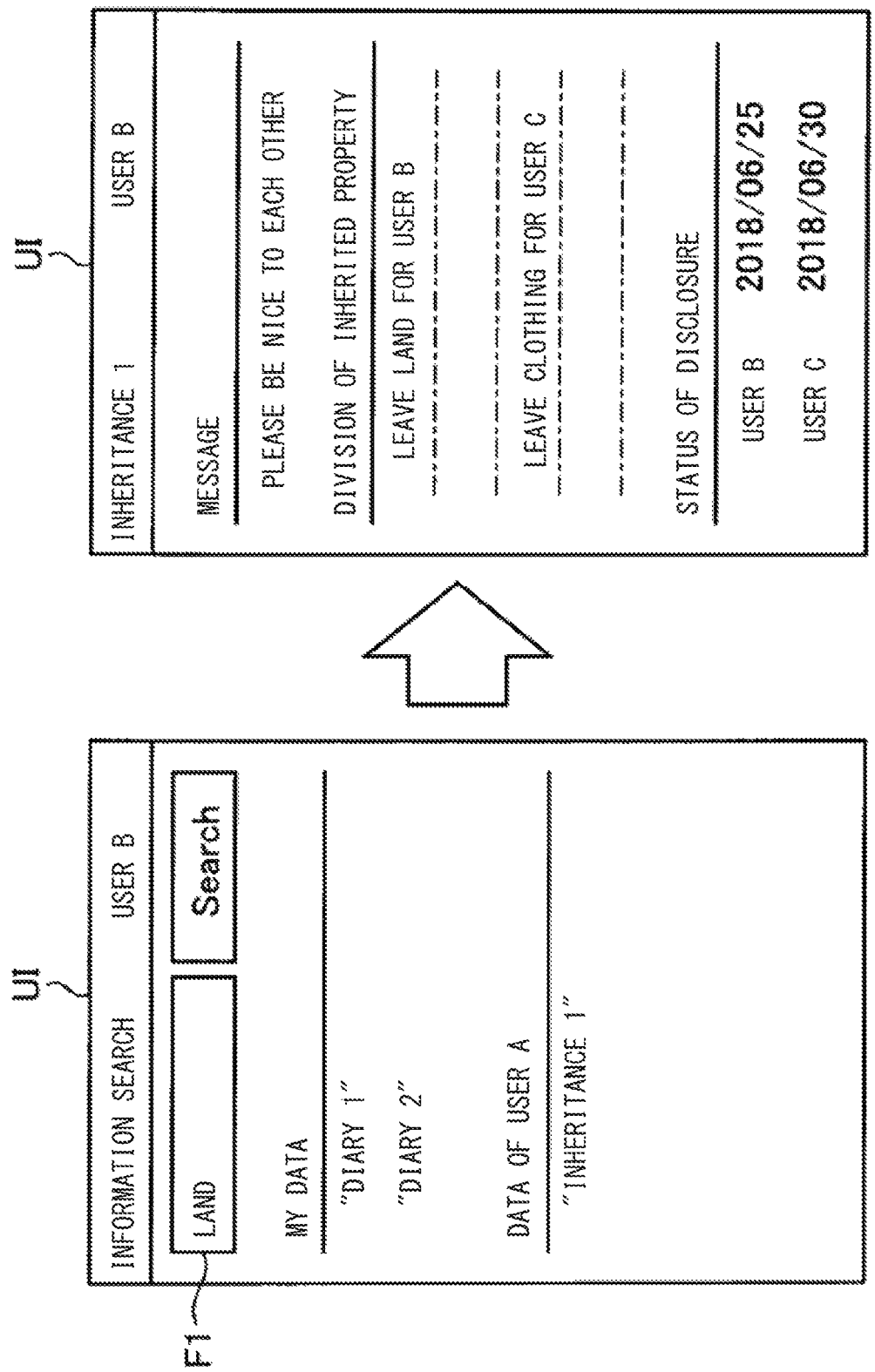

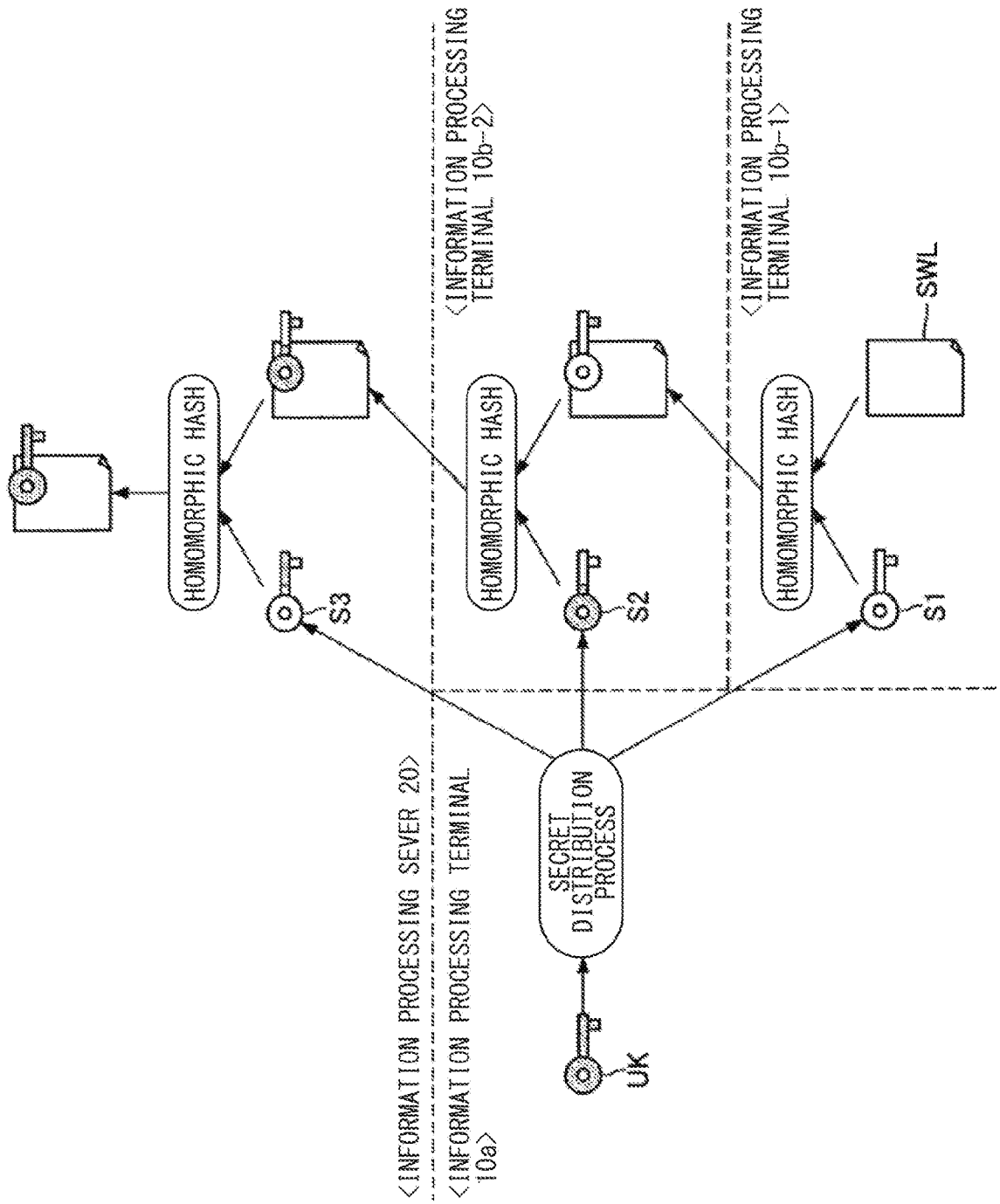
[FIG. 12]

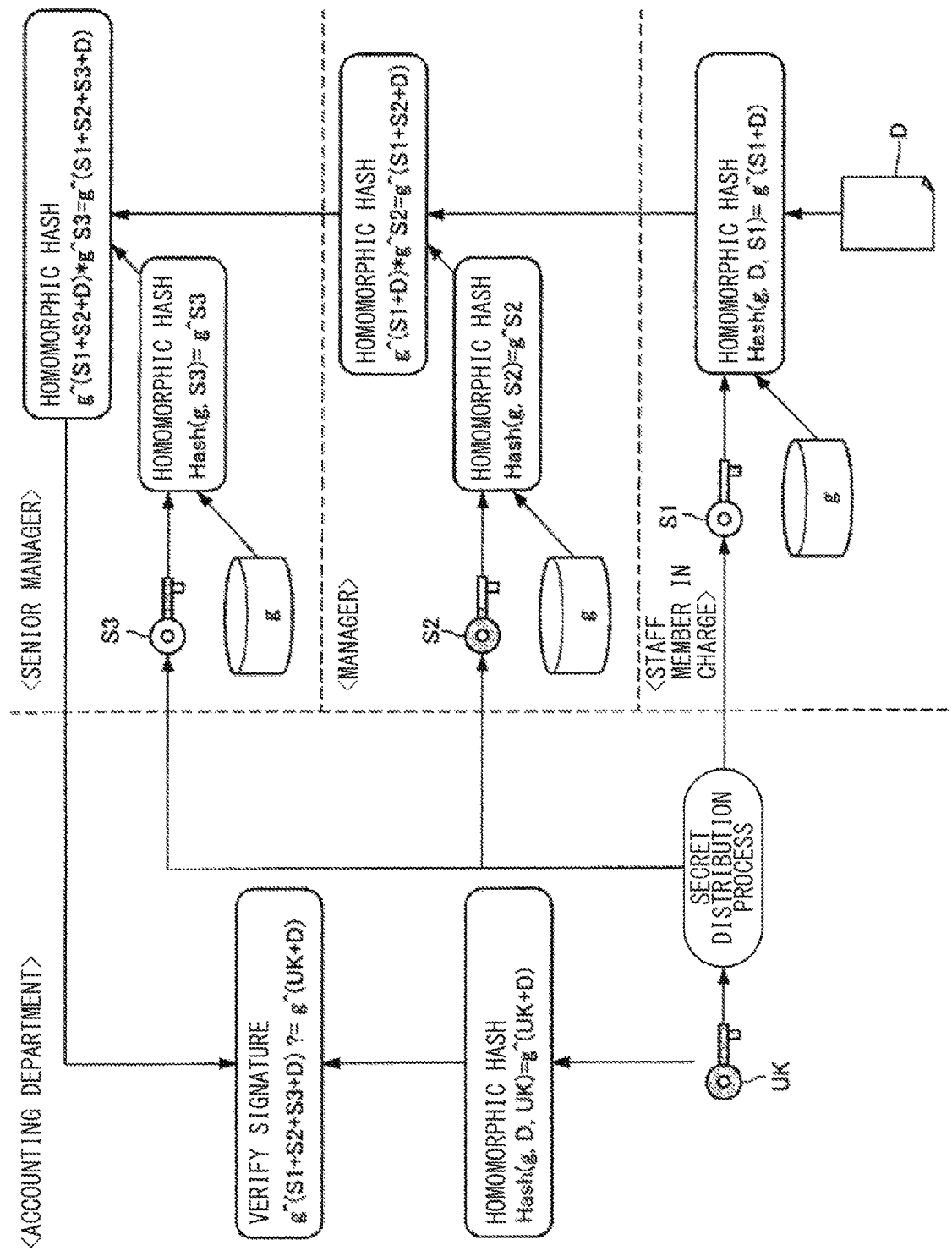
[FIG. 13]

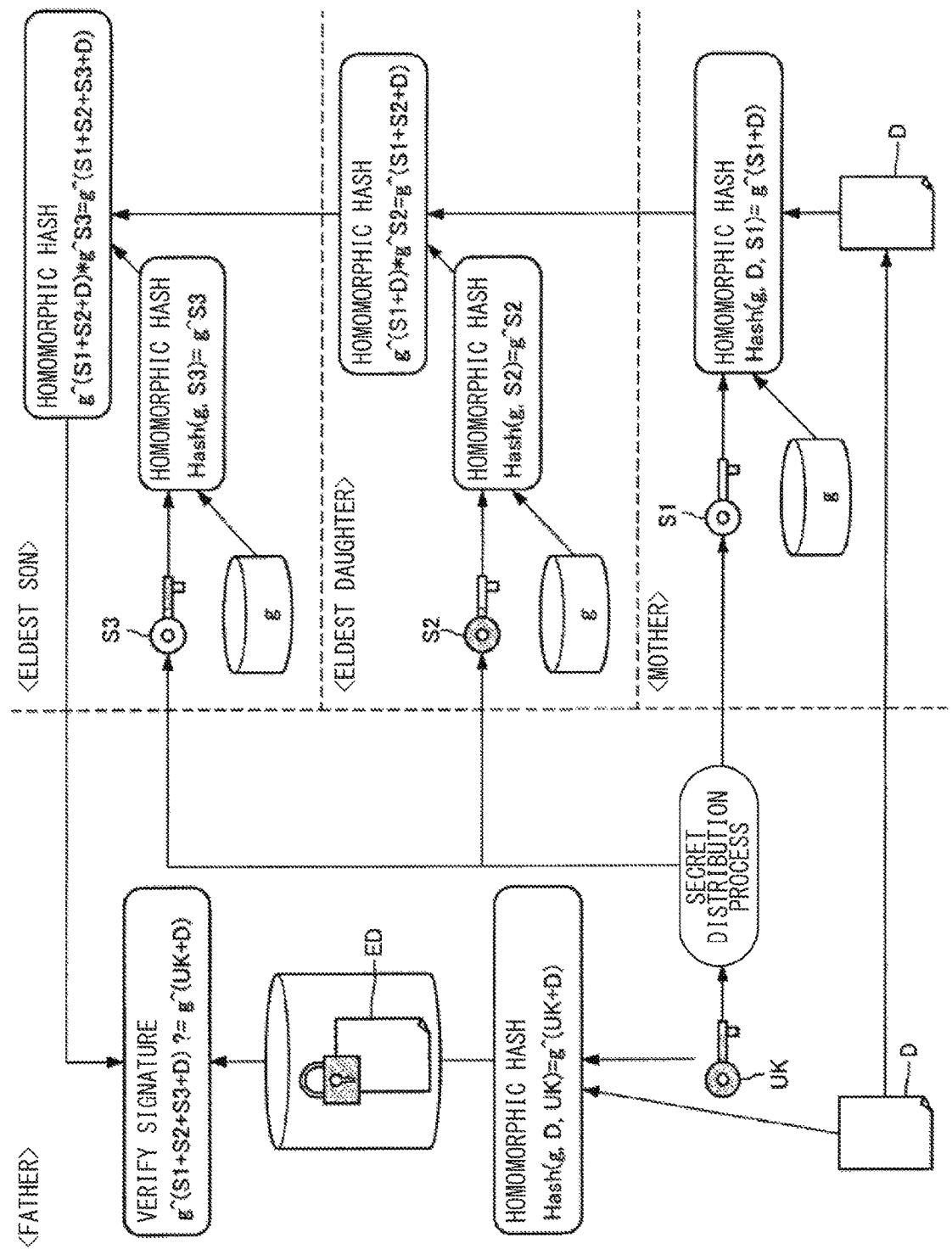
[FIG. 14]

[FIG. 15]
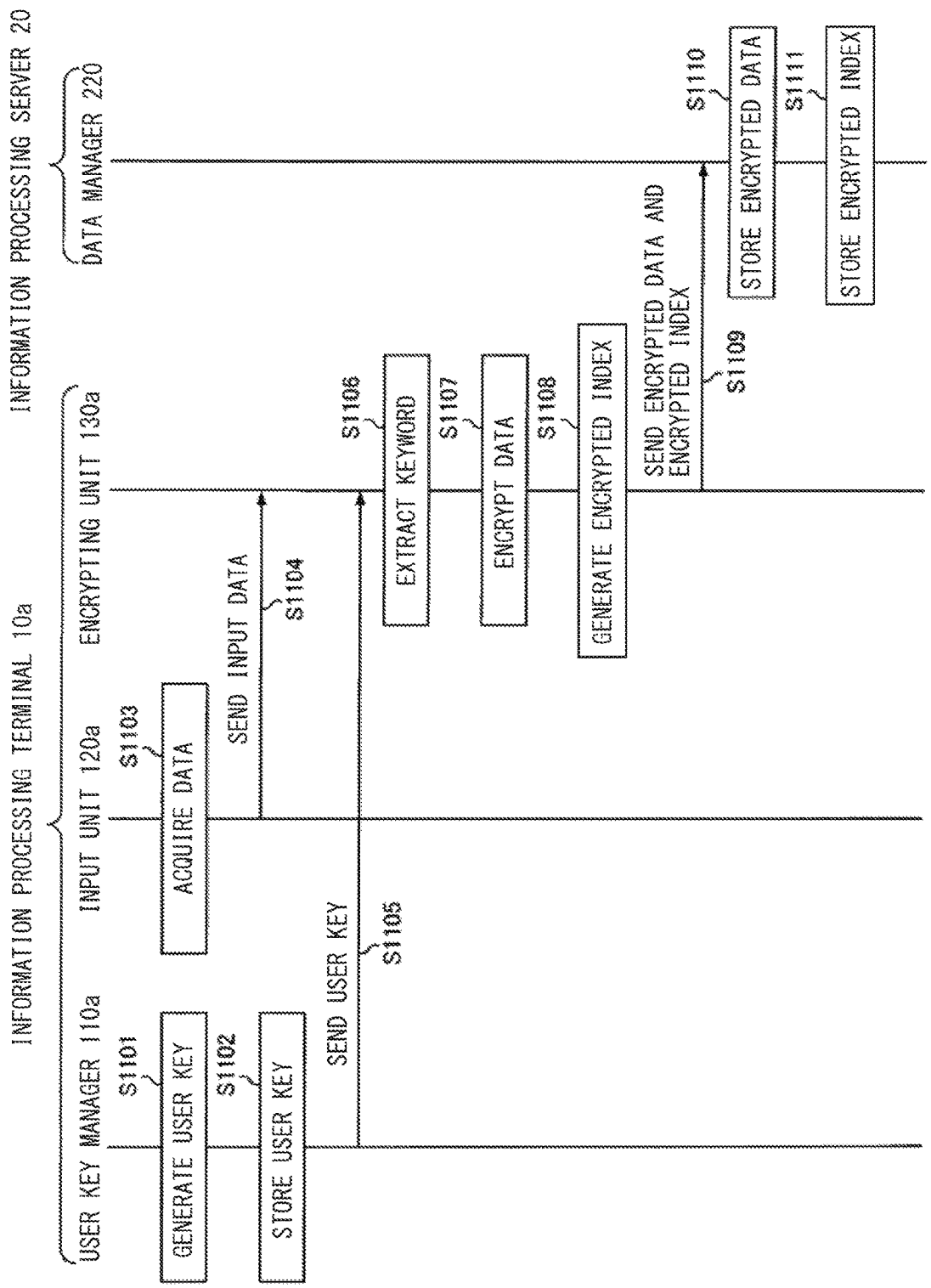

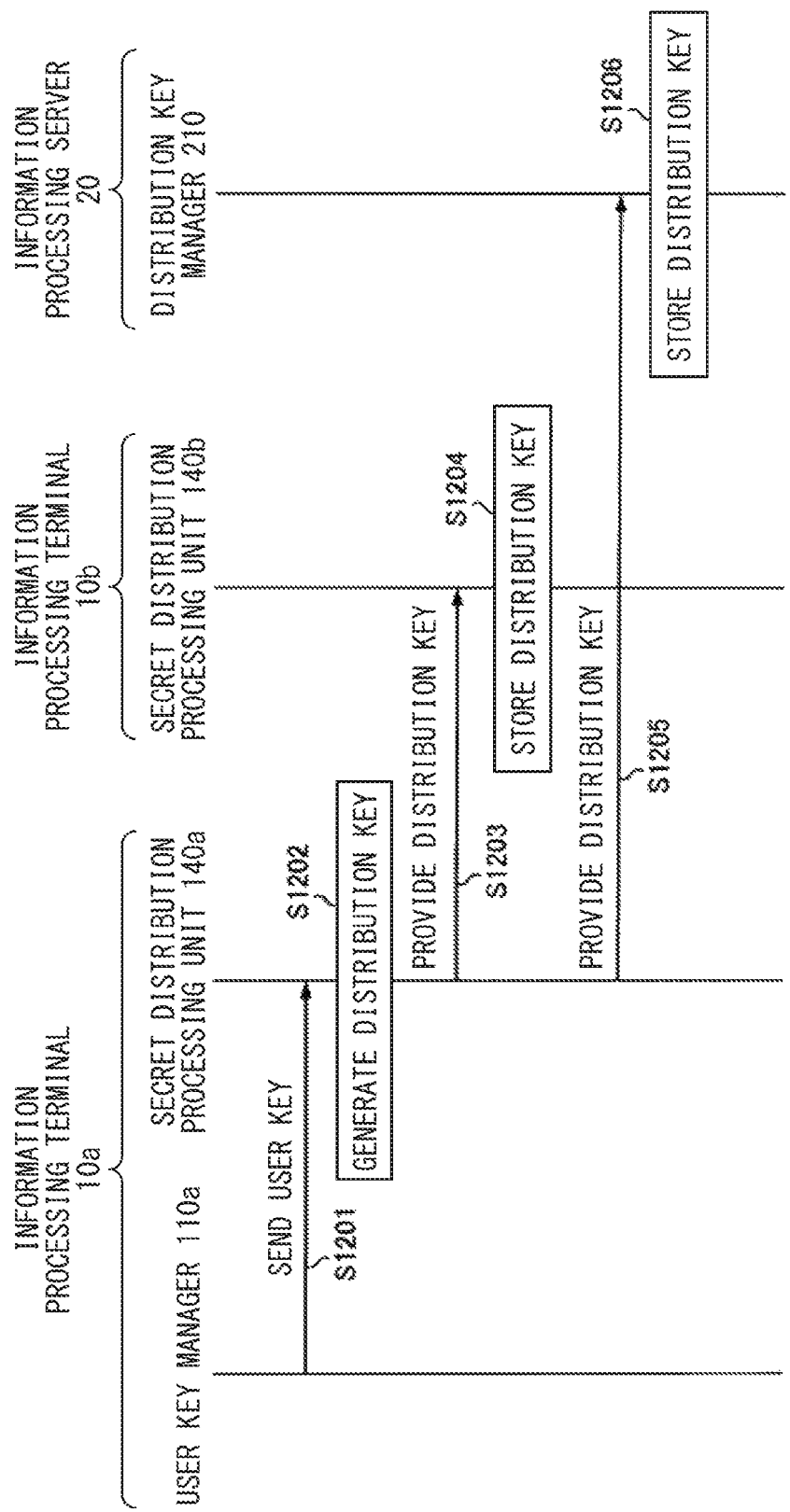

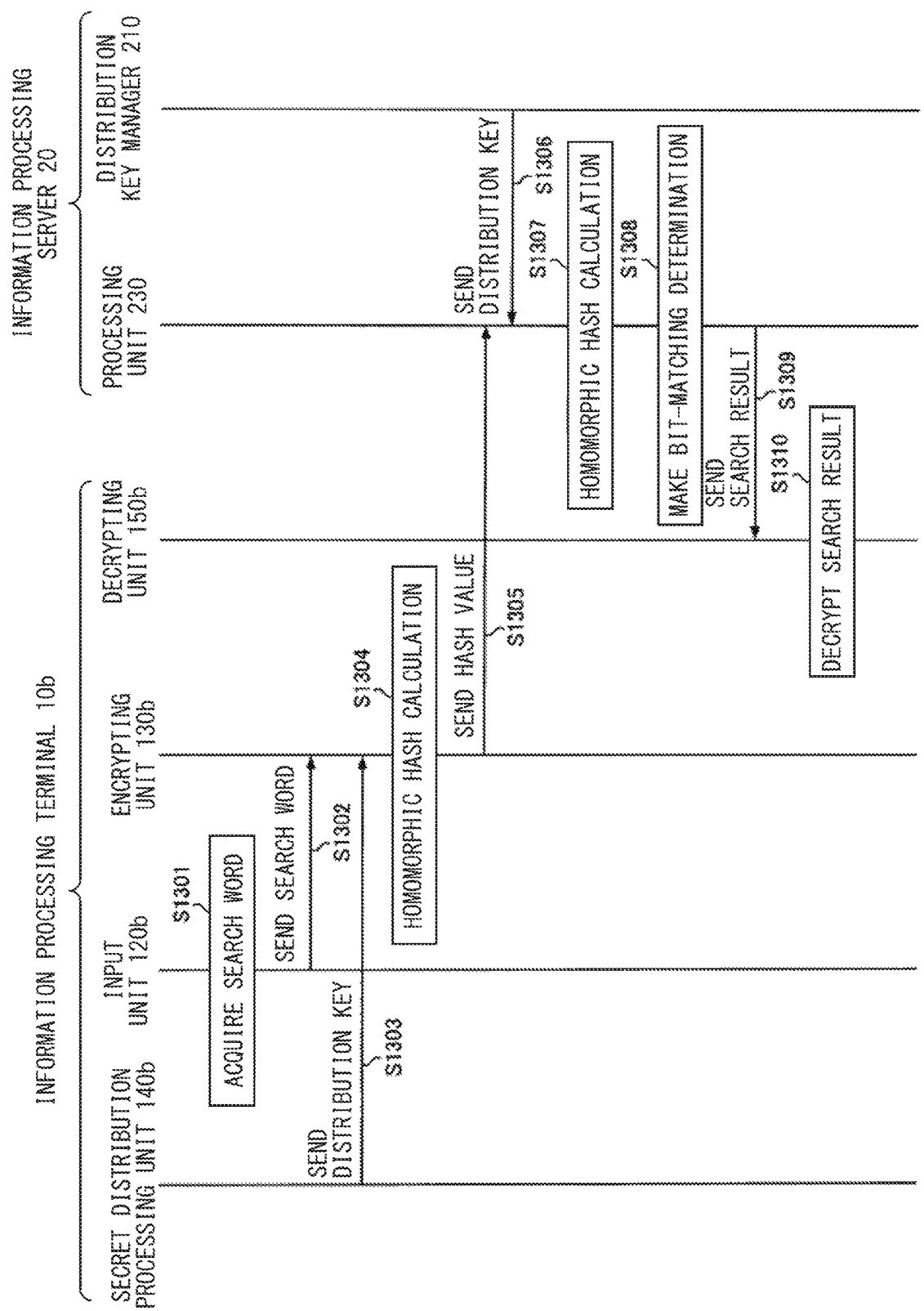
[FIG. 17]

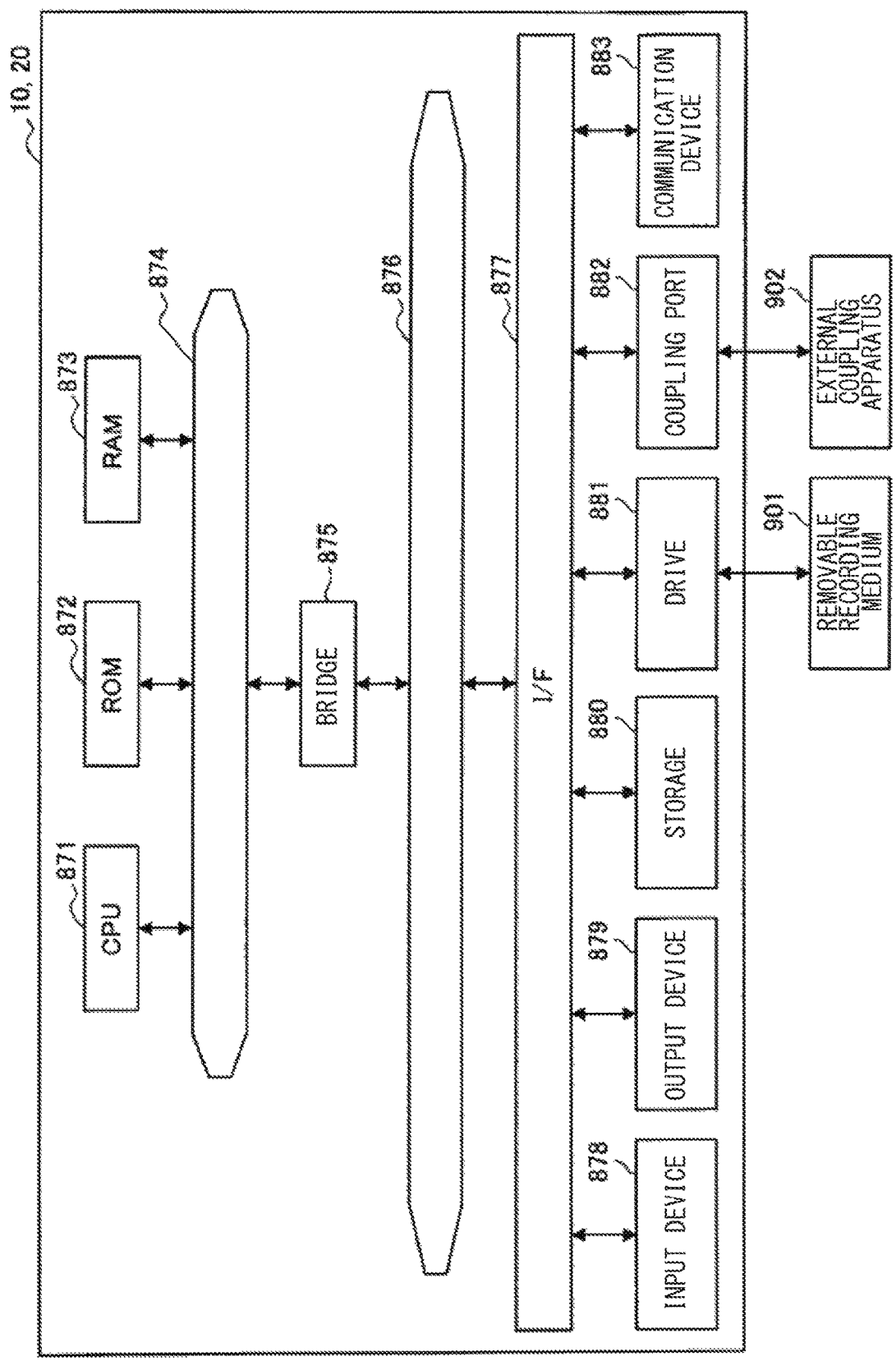
[FIG. 18]

INFORMATION PROCESSING SYSTEM, INFORMATION PROCESSING METHOD, AND INFORMATION PROCESSING APPARATUS

CROSS REFERENCE TO PRIOR APPLICATION

This application is a National Stage Patent Application of PCT International Patent Application No. PCT/JP2019/020337 (filed on May 22, 2019) under 35 U.S.C. § 371, which claims priority to Japanese Patent Application No. 2018-124568 (filed on Jun. 29, 2018), which are all hereby incorporated by reference in their entirety.

TECHNICAL FIELD

The present disclosure relates to an information processing system, an information processing method, and an information processing apparatus.

BACKGROUND ART

In recent years, cloud services or the like have been increasingly available. This leads to an increase in situations where individuals, companies, or the like hold data in servers that service providers manage. In such servers described above, data are typically encrypted to ensure the level of security, for example. In addition, in recent years, a searchable encryption technology has been developed, achieving an information search with data encrypted. For example, PTL 1 discloses a technology that increases the speed of a searching process for large scale data in an information search using searchable encryption.

CITATION LIST

Patent Literature

PTL 1: Japanese Unexamined Patent Application Publication No. 2015-135541

SUMMARY OF THE INVENTION

Problems to be Solved by the Invention

Here, it is considered that the encrypted data are searched by not only the owner of the data, but also another user who is permitted by the owner to search the data, for example. However, the technology described in PTL 1 does not sufficiently support a multi-user information search.

Thus, the present disclosure proposes a novel and improved information processing system, information processing method, and information processing apparatus that make it possible to achieve a multi-user information search with a higher level of security.

Means for Solving the Problems

According to the present disclosure, there is provided an information processing system including: a first apparatus that divides a user key of a share-source user through a secret distribution process to generate a plurality of distribution keys; a second apparatus that sends a processing request to execute a predetermined process by using one of a plurality of the distribution keys generated by the first apparatus; and a third apparatus that makes a determination based on one of a plurality of the distribution keys generated by the first apparatus and the processing request received from the second apparatus. The first apparatus provides the respective distribution keys different from each other among a plurality of the generated distribution keys to the second apparatus used by a share-target user and the third apparatus. The second apparatus sends a hash value to the third apparatus. The hash value is calculated through homomorphic hash calculation based on the received distribution key and input data. The third apparatus compares a hash value calculated through homomorphic hash calculation based on the hash value received from the second apparatus and the distribution key received from the first apparatus with a hash value calculated through homomorphic hash calculation based on the user key to determine whether or not to execute the predetermined process.

In addition, according to the present disclosure, there is provided an information processing method including: dividing, by a first apparatus, a user key of a share-source user through a secret distribution process to generate a plurality of distribution keys; sending, by a second apparatus, a processing request to execute a predetermined process by using one of a plurality of the distribution keys generated by the first apparatus; and making, by a third apparatus, a determination based on one of a plurality of the distribution keys generated by the first apparatus and the processing request received from the second apparatus. The information processing method further includes providing, by the first apparatus, the respective distribution keys different from each other among a plurality of the generated distribution keys to the second apparatus used by a share-target user and the third apparatus, sending, by the second apparatus, a hash value calculated through homomorphic hash calculation based on the received distribution key and input data to the third apparatus, and comparing, by the third apparatus, a hash value calculated through homomorphic hash calculation based on the hash value received from the second apparatus and the distribution key received from the first apparatus with a hash value calculated through homomorphic hash calculation based on the user key to determine whether or not to execute the predetermined process.

In addition, according to the present disclosure, there is provided an information processing apparatus including: a secret distribution processing unit that divides a user key of a share-source user through a secret distribution process to generate a plurality of distribution keys; and a communicating unit that sends the respective distribution keys different from each other among a plurality of the distribution keys to a terminal used by a share-target user and a server that stores encrypted data.

Effects of the Invention

As described above, according to the present disclosure, it is possible to achieve a multi-user information search with a higher level of security.

It is to be noted that the above-described effects are not necessarily limitative. Any of the effects indicated in this description or other effects that may be understood from this description may be exerted in addition to the above-described effects or in place of the above-described effects.

BRIEF DESCRIPTION OF DRAWING

FIG. 1 is a diagram for describing searchable encryption.
FIG. 2 is a diagram for describing a difference between an information processing method according to an embodiment of the present disclosure and a comparative technique.

FIG. 3 is a block diagram illustrating a configuration example of an information processing system according to the embodiment.

FIG. 4 is a block diagram illustrating a functional configuration example of an information processing terminal according to the embodiment.

FIG. 5 is a block diagram illustrating a functional configuration example of an information processing server according to the embodiment.

FIG. 6 is a diagram for describing generation of an encrypted index according to the embodiment.

FIG. 7 is a diagram for describing a search of encrypted data by a user who registers the encrypted data and an encrypted index according to the embodiment.

FIG. 8 is a diagram for describing a search of the encrypted data by a share-target user according to the embodiment.

FIG. 9 is a diagram illustrating an example of a management table of a distribution key according to the embodiment.

FIG. 10 is a diagram for describing decryption of encrypted data by an information processing terminal used by a share-target user according to the embodiment.

FIG. 11 is a diagram illustrating an example of a user interface controlled by the information processing server according to the embodiment.

FIG. 12 is a diagram for describing a process in a case where a plurality of share-target users according to the embodiment exists.

FIG. 13 is a diagram for describing an example of an approval flow to which the information processing method according to the embodiment is applied.

FIG. 14 is a diagram illustrating an example of execution of a process by unanimous agreement between share-target users, to which the information processing method according to the embodiment is applied.

FIG. 15 is a sequence diagram illustrating a flow of registration of encrypted data and an encrypted index according to the embodiment.

FIG. 16 is a sequence diagram illustrating a flow of provision of the distribution key according to the embodiment.

FIG. 17 is a sequence diagram illustrating a flow of a searching process according to the embodiment.

FIG. 18 is a diagram illustrating a hardware configuration example according to an embodiment of the present disclosure.

MODES FOR CARRYING OUT THE INVENTION

The following describes a preferred embodiment of the present disclosure in detail with reference to the accompanying drawings. It is to be noted that, in this specification and the accompanying drawings, components that have substantially the same functional configuration are indicated by the same reference signs and redundant description thereof is thus omitted.

It is to be noted that description is given in the following order.
1. Embodiment
1.1. Background
1.2. Configuration Example of Information Processing System 1
1.3. Functional Configuration Example of Information Processing Terminal 10
1.4. Functional Configuration Example of Information Processing Server 20
1.5. Details of Function
1.6. Flow of Operation
2. Hardware Configuration Example
3. Conclusion

1. Embodiment

1.1. Background

First, the background of an embodiment of the present disclosure is described. As described above, in recent years, cloud services or the like have been increasingly available. This leads to an increase in situations where individuals, companies, or the like hold data in servers that service providers manage. In addition, in typical servers, data of users are protected in a technique such as encrypting databases.

However, in typical cloud services, decryption keys for decrypting data are sometimes managed in servers. Service administrators or service venders having the authority are each able to decrypt the user data by using the decryption key. To prevent such a case, it is important to perform control to allow only the user terminal used by the user to decrypt the user data held in the server.

Here, examples of a technique of achieving such control described above include encrypting user data on a client side. A user sends, to a server, encrypted data that are encrypted by using a user-specific key (hereinafter, also referred to as a user key) managed by a client terminal, or holds the user key in the server. At the time of decryption, it is possible to decrypt the above-described encrypted data downloaded from the server by using the user key. With such an encryption technology on the client side described above, the decryption key is not managed in the server. This makes it possible to prevent unauthorized data acquisition by a service administrator or the like as described above.

Furthermore, in recent years, searchable encryption has been gaining widespread use. The searchable encryption makes it possible to perform a searching process with data to be searched and search words encrypted.

FIG. 1 is a diagram for describing searchable encryption. The left portion of FIG. 1 illustrates an example of a process in a case where a user U registers encrypted data ED in a server installed on a cloud side.

The user U first uses a client terminal installed on a local side to encrypt given data D by using a user key UK to generate the encrypted data ED. In addition, at this time, the client terminal similarly encrypts a keyword list extracted from the data D by using the user key UK to generate an encrypted index EI. The encrypted data ED and the encrypted index EI generated by the client terminal are sent to the server installed on the cloud side, and are held therein.

In addition, the right portion of FIG. 1 illustrates an example of a process in a case where the user U searches the encrypted data ED held in the server.

In the searching process, the client terminal first uses the user key UK to encrypt a search word inputted by the user U, and sends a generated encrypted keyword EKW to the server. Then, the server determines whether or not the held encrypted index EI includes the received encrypted keyword EKW. Here, in a case where the encrypted index EI includes the encrypted keyword EKW, the server sends the held encrypted data ED to the client terminal as a search result corresponding to the encrypted keyword EKW. Then, the client terminal decrypts the received encrypted data ED by using the user key UK to present an acquired plaintext or the like to the user U.

In this way, the searchable encryption technology makes it possible to perform an information search of encrypted data without decrypting the encrypted data, and makes it possible to further increase the level of security.

However, the searchable encryption technology as described, for example, in PTL 1 typically does not sufficiently support a multi-user search information search. Thus, in a case where a user other than the user who registers encrypted data wishes to search the encrypted data, it is requested, for example, to share a user key of a share-source user used to generate the encrypted data with a share-target user. Here, the share-source user is a user who registers, in the server, encrypted data generated by using the user key of the user. The share-target user refers to a user permitted by the share-source user to search the encrypted data. However, in a case where the user key of the share-source user is shared with the share-target user, spoofing is possible. This decreases the level of security.

Furthermore, to achieve a multi-user search, it is possible to generate, for each share-target user, an encrypted index for a search with the terminal of the share-source user. In this case, however, an increasing number of share-target users require the terminal to acquire past data and re-generate encrypted indices. This imposes a large amount of processing load.

Furthermore, in addition to those described above, it may be possible to use a broadcast encryption method, a pairing method, a proxy re-encryption method, or the like. However, these methods require a large amount of calculation.

The technical idea according to the embodiment of the present disclosure has been made in view of the points described above, and achieves a high-performance multi-user information search with a high level of security. The technical idea according to the embodiment of the present disclosure eliminates the need of sharing, with a share-target user, a user key of a share-source user who registers encrypted data and enables the share-target user to perform an information search of the encrypted data.

Thus, an information processing system that achieves an information processing method includes: a first apparatus that divides a user key of a share-source user through a secret distribution process to generate a plurality of distribution keys; a second apparatus that sends a processing request to execute a predetermined process by using one of the plurality of distribution keys generated by the first apparatus; and a third apparatus that makes a determination based on one of the plurality of distribution keys generated by the first apparatus and the processing request received from the second apparatus. Here, the first apparatus may provide respective distribution keys different from each other among the plurality of generated distribution keys to the second apparatus used by a share-target user and the third apparatus. In addition, the second apparatus may send, to the third apparatus, a hash value calculated through homomorphic hash calculation based on the received distribution key and input data. Furthermore, the third apparatus may compare a hash value calculated through homomorphic hash calculation based on the hash value received from the second apparatus and the distribution key received from the first apparatus with a hash value calculated through homomorphic hash calculation based on the above-described user key to determine whether or not to execute the predetermined process.

Furthermore, the third apparatus may execute the predetermined process in a case where the hash value calculated through homomorphic hash calculation based on the hash value received from the second apparatus and the distribution key received from the first apparatus matches the hash value calculated through homomorphic hash calculation based on the above-described user key.

FIG. 2 is a diagram for describing a difference between the information processing method according to the embodiment of the present disclosure and a comparative technique. It is to be noted that FIG. 2 illustrates, as a user Ua, a share-source user who uses the user key UK of the share-source user to generate the encrypted data ED and the encrypted index EI and registers the encrypted data ED and the encrypted index EI in a server. FIG. 2 illustrates, as a user Ub, a share-target user who searches the encrypted data ED on the basis of permission from the user Ua.

First, the comparative technique is described. The left portion of FIG. 2 illustrates an outline of the comparative technique in a case where a typical searchable encryption technology is applied to a multi-user search.

In a case of the comparative technique, the user Ua who is a share-source user shares the user key UK of the user Ua with the user Ub who is a share-target user. This allows the encrypted data ED held in the server to be searched. The user key UK of the user Ua is used by the user Ua to generate the encrypted data ED and the encrypted index EI. However, in a case where the user key UK is shared with another user in this way, spoofing is possible. This decreases the level of security.

In contrast, the right portion of FIG. 2 illustrates an outline of the information processing method (proposed technique) according to the present embodiment. In the information processing method according to the present embodiment, a first apparatus used by the user Ua who is a share-source user first divides the user key UK into a distribution key S1 and a distribution key S2 through a secret distribution process. The user key UK is used to generate the encrypted data ED and the encrypted index EI. In addition, the first apparatus respectively provides the generated distribution key S1 and distribution key S2 to a second apparatus used by the user Ub who is a share-target user and a third apparatus installed on a cloud side.

Next, the second apparatus used by the user Ub performs homomorphic hash calculation based on a search word inputted by the user Ub and the distribution key S1 to send the calculated hash value to the third apparatus.

Next, the third apparatus further performs homomorphic hash calculation for the hash value received from the second apparatus by using the distribution key S2 received from the first apparatus. Then, the third apparatus determines whether or not the encrypted index EI includes the hash value calculated through the homomorphic hash calculation described above. In a case where the encrypted index EI includes the hash value, the third apparatus may send, to the second apparatus, a search result corresponding to the search word inputted by the user Ub. Here, examples of the search result described above include the encrypted data ED including the search word, a list of the encrypted data ED including the search word, and the like.

In this way, the information processing system that achieves the information processing method according to the present embodiment eliminates the need of sharing the user key of the share-source user with the share-target user, and enables the share-target user to search encrypted data. This makes it possible to further increase the level of security.

of the following describes features of the information processing system that achieves the information processing method according to the present embodiment, and effects brought about by the features in detail.

1.2. Configuration Example of Information Processing System 1

First, a configuration example of an information processing system 1 according to the embodiment of the present disclosure is described. FIG. 3 is a block diagram illustrating a configuration example of the information processing system 1 according to the present embodiment. Referring to FIG. 3, the information processing system 1 according to the present embodiment includes a plurality of information processing terminals 10 and an information processing server 20. In addition, the respective components described above are coupled through a network 30 to allow for communication with each other.

(Information Processing Terminal 10)

The information processing terminal 10 according to the present embodiment is an information processing apparatus used by a share-source user or a share-target user. In other words, the information processing terminal 10 according to the present embodiment corresponds to the first apparatus or the second apparatus described above. It is to be noted that the information processing terminal 10 according to the present embodiment may serve as both the first apparatus and the second apparatus. For example, a user who uses the information processing terminal 10 may be a share-source user who permits another user to search encrypted data registered by the user and at the same time, may be a share-target user who is permitted to search encrypted data registered by another user.

The information processing terminal 10 according to the embodiment may be, for example, PC (Personal Computer), a smartphone, a tablet, or the like.

It is to be noted that the present disclosure sometimes refers to the information processing terminal 10 as a client. In addition, the present disclosure sometimes refers to a process by the information processing terminal 10 as a process on a local side.

(Information Processing Sever 20)

The information processing server 20 according to the present embodiment is an information processing apparatus that holds encrypted data and an encrypted index each generated by the information processing terminal 10, and performs a searching process on the encrypted data on the basis of a processing request made by the information processing terminal 10. In other words, the information processing server 20 according to the present embodiment corresponds to the third apparatus described above.

It is to be noted that the present disclosure sometimes refers to the information processing server 20 simply as a server. In addition, the present disclosure sometimes refers to a process by the information processing server 20 as a process on a cloud side.

(Network 30)

The network 30 has functions of coupling the information processing terminal 10 and the information processing server 20 and coupling the information processing terminals 10 to each other. The network 30 may include a public network such as the Internet, a telephone network, and a satellite communication network, various kinds of LANs (Local Area Networks) including Ethernet (registered trademark), WAN (Wide Area Network), and the like. In addition, the network 30 may also include a dedicated line network such as IP-VPN (Internet Protocol-Virtual Private Network). In addition, the network 30 may also include a wireless communication network such as Wi-Fi (registered trademark) or Bluetooth (registered trademark).

The above has described the configuration example of the information processing system 1 according to the embodiment of the present disclosure. It is to be noted that the configuration described above with reference to FIG. 3 is merely an example. The configuration of the information processing system 1 according to the present embodiment is not limited to that of the example. It is possible to flexibly modify the configuration of the information processing system 1 according to the present embodiment in accordance with the specifications and operations.

1.3. Functional Configuration Example of Information Processing Terminal 10

Next, a functional configuration example of an information processing terminal 10 according to the embodiment of the present disclosure is described. FIG. 4 is a block diagram illustrating a functional configuration example of the information processing terminal 10 according to the present embodiment. Referring to FIG. 4, the information processing terminal 10 according to the present embodiment includes a user key manager 110, an input unit 120, an encrypting unit 130, s secret distribution processing unit 140, a decrypting unit 150, a displaying unit 160, and a communicating unit 170.

(User Key Manager 110)

The user key manager 110 according to the present embodiment generates and holds a user key. The user key manager 110 may include, for example, a user key generator and a user key holding unit.

(Input Unit 120)

The input unit 120 according to the present embodiment detects the input of data to be encrypted by a user or the input of a search word by a user. Thus, the input unit 120 according to the present embodiment includes, for example, an input device such as a keyboard or a mouse.

(Encrypting Unit 130)

The encrypting unit 130 according to the present embodiment performs homomorphic hash calculation using a user key or a distribution key. The encrypting unit 130 according to the present embodiment operates as a registration processing unit that generates encrypted data or an encrypted index by using a user key, and a search processing unit that performs homomorphic hash calculation based on an inputted search word or a distribution key.

(Secret Distribution Processing Unit 140)

For example, the secret distribution processing unit 140 according to the present embodiment generates a distribution key, and holds a distribution key received from the other information processing terminal 10. For example, the secret distribution processing unit 140 according to the present embodiment divides a user key through a secret distribution process to generate a plurality of distribution keys.

(Decrypting Unit 150)

The decrypting unit 150 according to the present embodiment decrypts the encrypted data received from the information processing server 20 by using a user key.

(Displaying Unit 160)

The displaying unit 160 according to the present embodiment outputs visual information such as an image or a text. For example, the displaying unit 160 according to the present embodiment includes a user interface for inputting input data such as a search word and displaying a result of a processing request such as presenting a search result.

The displaying unit 160 according to the present embodiment therefore includes a display device that presents visual information. Examples of the display device described above include a liquid crystal display (LCD: Liquid Crystal Display) device, an OLED (Organic Light Emitting Diode) device, a touch panel, and the like.

(Communicating Unit 170)

The communicating unit 170 according to the present embodiment performs information communication through the network 30 with the information processing server 20 or the other information processing terminal 10. For example, in a registration process, the communicating unit 170 according to the present embodiment sends, to the information processing server 20, encrypted data and an encrypted index that the encrypting unit 130 has encrypted. In addition, for example, in a searching process, the communicating unit 170 sends a hash value calculated by the encrypting unit 130 through homomorphic hash calculation to the information processing server 20 or the other information processing terminal 10. Furthermore, for example, the communicating unit 170 sends a distribution key generated by the secret distribution processing unit 140 to the information processing server 20 or the other information processing terminal 10. In addition, the communicating unit 170 receives a distribution key generated by the other information processing terminal 10.

The above has described the functional configuration example of the information processing terminal 10 according to the present embodiment. It is to be noted that the configuration described above with reference to FIG. 4 is merely an example. The functional configuration of the information processing terminal 10 according to the present embodiment is not limited to that of the example. It is possible to flexibly modify the functional configuration of the information processing terminal 10 according to the present embodiment in accordance with the specifications and operations.

1.4. Functional Configuration Example of Information Processing Server 20

Next, a functional configuration example of the information processing server 20 according to the embodiment of the present disclosure is described. FIG. 5 is a block diagram illustrating a functional configuration example of the information processing server 20 according to the present embodiment. Referring to FIG. 5, the information processing server 20 according to the present embodiment includes a distribution key manager 210, a data manager 220, a processing unit 230, and a terminal communicating unit 240.

(Distribution Key Manager 210)

The distribution key manager 210 according to the present embodiment holds a distribution key received from the information processing terminal 10, or manages the matching of a distribution key that a share-source user provides to a share-target user, for example.

(Data Manager 220)

The data manager 220 according to the present embodiment holds encrypted data and an encrypted index received from the information processing terminal 10.

(Processing Unit 230)

The processing unit 230 according to the present embodiment makes a determination based on a hash value received from the information processing terminal 10 to execute a process such as presenting a search result to the information processing terminal 10. The processing unit 230 according to the present embodiment may include a homomorphic-hash processing section, a determination section that makes a bit-matching determination in terms of a hash value, and the like. It is to be noted that the processes executed by the processing unit 230 according to the present embodiment are not limited to those described above. The processing unit 230 according to the present embodiment may perform a settlement process, document disclosure, or the like based on a received hash value as described below.

(Terminal Communicating Unit 240)

The terminal communicating unit 240 according to the present embodiment performs information communication with the information processing terminal 10 through the network 30. For example, the terminal communicating unit 240 according to the present embodiment receives encrypted data and an encrypted index from the information processing terminal 10. In addition, for example, the terminal communicating unit 240 according to the present embodiment receives a hash value from the information processing terminal 10, and sends, for example, a result of a process based on the hash value to the information processing terminal 10.

The above has described the functional configuration example of the information processing server 20 according to the present embodiment. It is to be noted that the functional configuration described above with reference to FIG. 5 is merely an example. The functional configuration of the information processing terminal 20 according to the present embodiment is not limited to that of the example. It is possible to flexibly modify the functional configuration of the information processing server 20 according to the present embodiment in accordance with the specifications and operations.

1.5. Details of Function

Next, the functions of the information processing system 1 according to the embodiment are described in detail. As described above, the information processing system 1 according to the present embodiment achieves a multi-user search with a high level of security using the searchable encryption technology. Here, typical techniques of the searchable encryption technology include public-key encryption, common-key encryption, a hash scheme, and the like.

However, the public-key encryption described above is a method using pairing, and thus has a problem with performance. In addition, the common-key encryption has a difficulty in application to multiple users although the common-key encryption provides practical performance for a single user as compared with the public-key encryption.

Thus, the information processing method according to the present embodiment employs a searchable encryption technology using a hash system. The hash system is a system in which a keyword list is hashed, and is used as an encrypted index. The information processing method according to the present embodiment uses a keyed hash (Keyed hash) using a specific user key for each user, which makes it possible to ensure confidentiality.

Furthermore, the hash system makes it possible to generate an encrypted index having a fixed length regardless of the number of keywords, and makes it possible to perform a process using hash calculation. This enables an increase in the speed of processing as compared with encryption.

It is to be noted that, in addition to a hash value calculated through homomorphic hash calculation, the information processing method according to the present embodiment may employ an encrypted index obtained by encoding the hash value into a form of AMQ (Approximate Membership Query). Examples of the form of AMQ described above include a Bloom filter and a counting filter.

Here, the generation of the above-described encrypted index by the information processing terminal 10 is described in detail. FIG. 6 is a diagram for describing the generation of an encrypted index according to the present embodiment.

First, the encrypting unit 130 of the information processing terminal 10 according to the present embodiment extracts a keyword W included in the given data D on the basis of a user operation to generate a keyword list KL. At this time, for example, the encrypting unit 130 may perform morphological analysis to extract a keyword, or use n-gram to extract a word.

Next, the encrypting unit 130 according to the present embodiment uses the user key UK to hash the generated keyword list KL to generate the encrypted index EI. Specifically, the encrypting unit 130 according to the present embodiment performs, for each keyword W, homomorphic hash calculation based on a homomorphic hash parameter g, the user key UK, and the keyword W, and maps a calculated hash value $g^{(UK+W)}$ to a Bloom filter. This makes it possible to generate the encrypted index EI. The homomorphic hash parameter g is public information. Thus, in a case where the keyword list KL includes a plurality of the keywords W, a plurality of bits is set on the Bloom filter. The encrypting unit 130 is also able to calculate hash values by using different hash functions for the one keyword W, and set a plurality of bits.

The communicating unit 170 sends, to the information processing server 20, the encrypted index EI generated by the encrypting unit 130 as described above together with the corresponding encrypted data ED. In addition, the data manager 220 of the information processing server 20 holds the received encrypted index EI and encrypted data ED.

Next, a search of encrypted data by a user is described who registers the encrypted data ED and the encrypted index EI. FIG. 7 is a diagram for describing a search of encrypted data by a user who registers the encrypted data ED and the encrypted index EI according to the present embodiment.

In a case where the user who makes registration performs a search, the encrypting unit 130 performs the homomorphic hash calculation described above on a search word list SWL outputted from the input unit 120 to generate the encrypted keyword EKW in which the calculated hash values are mapped to the Bloom filter. At this time, in a case where the search word list SWL includes a plurality of search words and an AND search is designated as a searching condition, the encrypting unit 130 may map hash values related to the respective search words to a single Bloom filter. In contrast, in a case where the search word list SWL includes a plurality of search words and an OR search is designated as a searching condition, the encrypting unit 130 performs mapping to a Bloom filter for each of the search words.

Furthermore, the communicating unit 170 sends the encrypted keyword EKW generated by the encrypting unit 130 as described above to the information processing server 20.

Next, the processing unit 230 of the information processing server 20 compares the encrypted keyword EKW received from the information processing terminal 10 with the plurality of encrypted indices EI held in the data manager 220. Specifically, the processing unit 230 may make a matching determination between the encrypted keyword EKW and encrypted indices EI1 to EI3 on a bit-by-bit basis.

Here, in a case where a bit corresponding to a 1-value bit of the encrypted keyword EKW is also a unary bit similarly in the encrypted index EI, the processing unit 230 determines that the encrypted index EI includes the encrypted keyword EKW, and sends a search result SR to the information processing terminal 10 through the terminal communicating unit 240. Examples of the search result SR include the encrypted data ED corresponding to the encrypted index EI, a list of the encrypted data ED, and the like.

Next, a search of the encrypted data by a share-target user according to the present embodiment is described. FIG. 8 is a diagram for describing a search of the encrypted data by a share-target user according to the present embodiment. It is to be noted that, in FIG. 2, an information processing terminal 10a corresponds to the first apparatus used by a share-source user, and an information processing terminal 10b corresponds to the second apparatus used by a share-target user. In addition, the information processing server 20 corresponds to the third apparatus.

First, the secret distribution processing unit 140 of the information processing terminal 10a used by a share-target user divides the user key UK of a share-source user through a secret distribution process to generate the two distribution keys S1 and S2. At this time, the secret distribution processing unit 140 uses a secret distribution process having an additive homomorphic property to generate the distribution keys. It is to be noted that the secret distribution processing unit 140 may generate the distribution keys only once in a case where the share-source user permits the share-target user to perform a search. However, for example, in a case of losing the information processing terminal 10b used by the share-target user, the secret distribution processing unit 140 may generate the distribution keys again.

Furthermore, the communicating unit 170 respectively provides the distribution keys S1 and S2 to the information processing terminal 10b and the information processing server 20. It is to be noted that the distribution key S1 is considered, for example, to be provided to the information processing terminal 10b by using near field wireless communication, be transmitted through image data such as a QR code (registered trademark), or be provided by using end-to-end (end to end) communication through the information processing server 20.

Next, as illustrated on the right portion of the diagram, the encrypting unit 130 of the information processing terminal 10b performs exponential homomorphic hash calculation using the received distribution key S1 and the homomorphic hash parameter g to calculate a hash value $g^{(S1+WN)}$ for each of keyword word $W^1$ to $W^N$ inputted as search words. Here, the homomorphic hash parameter g is public information that has the same value, and is shared in advance between the information processing terminal 10b and the information processing server 20. In addition, the communicating unit 170 of the information processing terminal 10b sends the calculated hash values to the information processing server 20.

Next, the processing unit 230 of the information processing server 20 performs homomorphic hash calculation based on the hash value $g^{(S1+WN)}$ received from the information processing terminal 10b and the distribution key S2 received from the information processing terminal 10a.

Specifically, the processing unit 230 performs exponential homomorphic hash calculation on the basis of the distribution key S2 and the homomorphic hash parameter g to calculate a hash value $g^{S2}$. Then, the processing unit 230 performs multiplying homomorphic hash calculation based on the calculated hash value $g^{S2}$ and the hash value $g^{(S1+WN)}$ received from the information processing terminal 10b. At this time, the calculated hash value is $g^{(S1+W)} * g^{S2} = g^{(S1+S2+W)} = g^{(UK+W)}$, and is to the same as the hash value at the time of a search by a registrant described with reference to FIG. 7.

In this way, according to the information processing method according to the present embodiment, the two distribution keys S1 and S2 obtained by dividing the user key of the share-source user are respectively provided to the information processing terminal 10b used by the share-target user and the information processing server 20. This enables the share-target user to perform an information search similar to that performed by the share-source user only in a case where the paired distribution keys S1 and S2 match.

According to the information processing method according to the present embodiment, it is not possible to acquire the encrypted data ED only with the distribution key S1 or S2. This makes it possible to effectively prevent a service administrator or the like from unauthorized data acquisition or the like.

Furthermore, in a case where the distribution key manager 210 of the information processing server 20 according to the present embodiment receives a deletion request from the secret distribution processing unit 140 of the information processing terminal 10a, the distribution key manager 210 may delete the corresponding distribution key. The function described above makes it possible to securely protect the encrypted data ED held in the information processing server 20, for example, even in a case where a permission period expires or in a case of losing the information processing terminal 10b.

Next, a method of managing a distribution key by the distribution key manager 210 according to the present embodiment is described. The above has described that the processing unit 230 performs multiplying homomorphic hash calculation based on the hash value received from the information processing terminal 10b and the hash value calculated by using the distribution key received from the information processing terminal 10a. At this time, for example, the processing unit 230 according to the present embodiment is able to identify a distribution key corresponding to the information processing terminal 10b on the basis of a management table held in the distribution key manager 210 to acquire the distribution key from the distribution key manager 210.

FIG. 9 is a diagram illustrating an example of a management table of a distribution key according to the present embodiment. As illustrated in FIG. 9, for example, distribution key IDs, share-target user IDs, share-source user IDs, and distribution keys are registered in the management table of distribution keys according to the present embodiment.

For example, in a case of the example illustrated in FIG. 8, a share-target user (user B) who is a user of the information processing terminal 10b logs in to a service through the user interface described above to identify a share-target user ID (user $ID^B$) corresponding to the share-target user (user B).

Furthermore, on the user interface described above, the share-target user (user B) designates, as a search target, encrypted data owned by a share-source user (user A) to identify a share-source user ID (user $ID^A$).

In this case, the processing unit 230 according to the present embodiment uses, as keys, the share-target user ID (user $ID^B$) and the share-source user ID (user $ID^A$) identified as described above to search the management table. This makes it possible to acquire a distribution key (distribution key$^{BA}$) corresponding to a distribution key ID (5).

It is to be noted that FIG. 9 illustrates an example in which the secret distribution process is applied to keys in a case where the share-source user performs a search (corresponding to a distribution key$^{AA}$ and a distribution key$^{BB}$). In this case, a process of homomorphic hash calculation using a distribution key as illustrated in FIG. 8 may be also performed in a case where the share-source user performs a search.

Meanwhile, the share-source user is able to hold the user key UK of the share-source user in the information processing terminal 10 as described above. Thus, the distribution keys of the share-source user illustrated in FIG. 9 (corresponding to the distribution key$^{AA}$ and the distribution key$^{BB}$) do not necessarily have to be held in the information processing server 20.

It is to be noted that, in a case where the share-target user searches the data of all the share-source users that the share-target user is permitted search, the processing unit 230 is able to scan and acquire all the share-source IDs associated with the share-target user ID and the corresponding distribution keys.

Next, the decryption of encrypted data by the information processing terminal 10 used by a share-target user is described. The search illustrated in FIG. 8 allows the information processing terminal 10b used by a share-target user uses to download the encrypted data ED from the information processing server 20 as a search result.

However, the encrypted data ED has been encrypted with the user key UK (secret key) specific to a share-source user, and the information processing terminal 10b that does not have the user key UK is not thus able to directly decrypt the encrypted data ED.

Thus, in the information processing method according to the present embodiment, re-encryption using proxy encryption is applied to solve the point described above.

FIG. 10 is a diagram for describing the decryption of encrypted data by the information processing terminal 10 used by a share-target user according to the present embodiment.

As described above, after sending the encrypted data ED and the encrypted index EI to the information processing server 20, the information processing terminal 10a used by the share-source user respectively provides the generated distribution keys S1 and S2 to the information processing server 20 and the information processing terminal 10b used by the share-target user who is permitted by the share-source user to search the encrypted data ED.

Next, the secret distribution processing unit 140 of the information processing terminal 10a receives a public key PK of the share-target user from the information processing terminal 10b used by the share-target user to generate a re-encryption key REK by using the public key PK and a secret key $SK^A$ of the share-source user. In addition, the communicating unit 170 sends the re-encryption key REK generated by the secret distribution processing unit 140 to the information processing server 20.

After this, in a case where a result of a processing request for an information search by the information processing terminal 10b used by the share-target user indicates that the corresponding encrypted data ED exists, the processing unit 230 generates re-encrypted data RED obtained by re-encrypting the encrypted data ED by using the re-encryption key REK received from the information processing terminal 10a. The terminal communicating unit 240 sends the re-encrypted data RED to the information processing terminal 10b as a search result.

Next, the decrypting unit 150 of the information processing terminal 10b decrypts the received re-encrypted data RED by using a secret key $SK^B$ of the share-target user.

In this way, the information processing method according to the present embodiment eliminates without the need of sharing a secret key of a share-source user with the information processing terminal 10b used by a share-target user, and enables the information processing terminal 10b to view data of the share-source user by using a secret key of the share-target user.

Next, the user interface according to the present embodiment is described. As described above, the information processing server 20 according to the present embodiment may control a user interface for inputting input data such as a search word and displaying a result of a processing request. The share-source user or the share-target user is able to make a searching request or view a search result through the user interface described above.

FIG. 11 is an example of a user interface UI controlled by the information processing server 20 according to the present embodiment. For example, as illustrated on the left portion of FIG. 11, a user may be able to input a recognized search word in a search field F1 displayed on the user interface UI, and press a search button, thereby acquiring a catalog of lists of encrypted data including the search word.

In a case of the example illustrated in FIG. 11, the user interface UI displays, for each owner of data, a list of encrypted data including a search word "LAND" inputted by the user in the search field F1. In a case where a user is a share-target user who is permitted by another user to search data, not only a list of data of the user such as "DIARY 1" or "DIARY 2", but also a list of data of a share-source user such as "INHERITANCE 1" are displayed as a search result.

Furthermore, at this time, for example, the share-target user selects the data such as "INHERITANCE 1" from the displayed lists. This makes it possible to check detailed information regarding the selected data as illustrated on the right portion of FIG. 11. The detailed information described above may include data itself before being encrypted, the status of disclosure, and the like.

In this way, the information processing system 1 that achieves the information processing method according to the present embodiment allows only a permitted user to safely search highly confidential document data such as a diary or a will with a smaller amount of processing load. Thus, this system is expected to be used in various types of services involving a searching process.

It is to be noted that the above has mainly described an example in which the number of second apparatuses according to the present embodiment is one, in other words, the number of share-target users is one. However, the number of second apparatuses according to the present embodiment, in other words, the number of share-target users is not limited to that of the example. The number of second apparatuses or the number of share-target users according to the present embodiment may be two or more.

In other words, the secret distribution processing unit 140 of the information processing terminal 10a used by a share-source user may generate, through a secret distribution process, distribution keys greater in number than share-target users by one. For example, in a case where the number of share-target users is one, the secret distribution processing unit 140 of the information processing terminal 10a used by the share-source user may generate two distribution keys in total to provide the respective distribution keys to the information processing terminal 10b used by the share-target user and the information processing server 20. In addition, for example, in a case where the number of share-target users is three, the secret distribution processing unit 140 of the information processing terminal 10a used by the share-source user may generate four distribution keys in total to provide the respective distribution keys to the three information processing terminals 10b used by the three share-target users and the information processing server 20.

FIG. 12 is a diagram for describing a process in a case where a plurality of share-target users according to the present embodiment exists. It is to be noted that FIG. 12 illustrates an example in which a share-source user who uses the information processing terminal 10a corresponding to as the first apparatus sets two share-target users who use information processing terminals 10b-1 and 10b-2 corresponding to the second apparatuses.

In a case of the example illustrated in FIG. 12, the secret distribution processing unit 140 of the information processing terminal 10a used by the share-source user divides the user key UK of the share-source user through a secret distribution process to generate the three distribution keys S1 to S3. In addition, the communicating unit 170 of the information processing terminal 10a respectively provides the three distribution keys S1 to S3 generated by the secret distribution processing unit 140 to the information processing terminal 10b-1, the information processing terminal 10b-2, and the information processing server 20.

At this time, the information processing server 20 corresponding to the third apparatus according to the present embodiment may compare the hash values sequentially calculated by all the plurality of information processing terminals 10b corresponding to the second apparatuses through homomorphic hash calculation using the distribution keys with the hash value calculated through homomorphic hash calculation based on the user key UK to determine whether or not it is possible to execute a predetermined process.

More specifically, it is possible to divide the plurality of information processing terminals 10b corresponding to the second apparatuses according to the present embodiment into a starting-point terminal serving as a starting point of a processing request, and a passing terminal through which the processing request passes. For example, in a case where a processing request is a request to present a search result, the starting-point terminal described above refers to a terminal into which a given search word is inputted by one of the share-target users who wishes to perform a search.

In a case of the example illustrated in FIG. 12, the information processing terminal 10b-1 to which the distribution key S1 is provided from the information processing terminal 10a corresponds to the starting-point terminal described above. At this time, the information processing terminal 10b-1 sends, to the information processing terminal 10b-2 corresponding to the passing terminal, a hash value calculated through homomorphic hash calculation based on the distribution key S1 and the search word list SWL extracted from a search word inputted by a user.

Next, the information processing terminal 10b-2 corresponding to the passing terminal calculates a hash value calculated through homomorphic hash calculation based on the hash value received from the information processing terminal 10b-1 corresponding to the passing terminal and the distribution key S2.

Here, in a case where there exist other passing terminals that have not performed other homomorphic hash calculation, the information processing terminal 10b-2 may send the calculated hash value to one of the other passing terminals. In contrast, in a case where there exists no passing terminal that has not performed homomorphic hash calculation as illustrated in FIG. 12, the information processing terminal 10b-2 sends the calculated hash value to the information processing server 20 corresponding to the third apparatus.

Next, the information processing server 20 multiplies the hash values sequentially calculated by all the second apparatuses, that is, the information processing terminals 10b to which the distribution keys are provided from the information processing terminal 10a by a hash value calculated through homomorphic hash calculation based on the distribution key S3 received from the information processing terminal 10a. This makes it possible to acquire a hash value similar to the user key UK.

In this way, as long as homomorphic hash calculation is not performed by the other information processing terminals 10b to which distribution keys are provided from the information processing terminal 10a, the information processing system 1 according to the present embodiment makes it possible to prevent data from being accessed by the certain information processing terminal 10b alone. In addition, each of the information processing terminals 10b receives only a hash value serving as a result of homomorphic hash calculation, and is not thus able to acquire any distribution keys provided to the other information processing terminals 10b. This makes it possible to prevent one of the share-target users from intercepting distribution keys provided to the other share-target users and acquiring information in an unauthorized manner.

It is to be noted that the processes executed by the processing unit 230 of the information processing server 20 according to the present embodiment are not limited to presenting a search result of encrypted data. The information processing method according to the present embodiment may be applied to various processes based on the secret distribution process and the searchable encryption technology described above.

For example, it is possible to use the information processing method according to the present embodiment as a portion of an approval flow for an accounting settlement process or the like. FIG. 13 is a diagram for describing an example of an approval flow to which the information processing method according to the present embodiment is applied.

FIG. 13 illustrates an example in which a settlement process requested by a staff member in charge is approved by an accounting department through a manager and a senior manager.

In a case of the example illustrated in FIG. 12, the first apparatus managed by the accounting department first divides the user key UK through a secret distribution process. In addition, the generated distribution keys S1 to S3 are provided respectively to the second apparatuses used by the staff member in charge, the manager, and the senior manager.

After the provision process described above, the second apparatus used by the staff member in charge performs a homomorphic hash calculation process based on the provided distribution key S1, the homomorphic hash parameter g, and the data D that are a settlement document inputted by the staff member in charge, and sends the calculated hash value to the second apparatus used by the manager who is the immediate boss.

Next, the second apparatus used by the manager performs homomorphic hash calculation based on the received hash value, the distribution key S2, and the homomorphic hash parameter g, and sends the calculated hash value to the second apparatus used by the senior manager who gives the next approval.

Next, the second apparatus used by the senior manager performs homomorphic hash calculation based on the received hash value, the distribution key S3, and the homomorphic hash parameter g, and sends the calculated hash value to the third apparatus managed by the accounting department who gives the final approval.

Here, the hash values calculated sequentially by the plurality of second apparatuses as described above may each function as an electronic signature. The third apparatus is able to determine whether or not to execute a settlement process by verifying the received electronic signatures described above.

Specifically, the third apparatus managed by the accounting department determines whether or not the hash value received from the second apparatus used by the senior manager matches the hash value calculated through homomorphic hash calculation based on the user key UK and the data D that are a settlement document $(g^{(S1+S2+S3+D)})? == g^{(UK+D)}$.

Here, in a case where both match $(g^{(S1+S2+S3+D)} == g^{(UK+D)})$, the third apparatus may execute the settlement process for the data D that are a settlement document.

The above has described a case where the information processing method according to the present embodiment is applied as a portion of an approval flow for a settlement process or the like. Such an approval flow described above to which the information processing method according to the present embodiment is applied makes it possible to achieve an approval flow with an extremely high level of security, and securely reject an application that does not pass through an authorized approval route.

Furthermore, the information processing method according to the present embodiment may be applied to the execution of a predetermined process by unanimous agreement between share-target users to which distribution keys are provided. FIG. 14 is a diagram illustrating an example of the execution of a process by unanimous agreement between share-target users, to which the information processing method according to the embodiment is applied.

FIG. 14 illustrates an example in which a will left by a father is disclosed by agreement between all the members of a family.

In a case of the example illustrated in FIG. 13, the first apparatus first divides the user key UK through a secret distribution process. In addition, the generated distribution keys S1 to S3 are provided respectively to the second apparatuses used by the mother, the eldest daughter, and the eldest son. In addition, in the example illustrated in FIG. 13, the data D that are a will disclosing request generated by the first apparatus is sent to the second apparatus used by the mother that is the starting-point terminal.

After the provision process described above, the second apparatus used by the mother performs a homomorphic hash calculation process based on the provided distribution key S1, the homomorphic hash parameter g, and the data D that are a will disclosing request, and sends the calculated hash value to the second apparatus used by the eldest daughter.

After this, the second apparatuses used by the eldest daughter and the eldest son each perform a process similar to the process illustrated in FIG. 13.

In addition, the third apparatus that holds the will left by the father determines whether or not the hash value received from the second apparatus used by the eldest son matches the hash value calculated through homomorphic hash calculation based on the user key UK and the data D ($g^{(S1+S2+S3+D)}?=g^{(UK+D)}$).

Here, in a case where both match ($g^{(S1+S2+S3+D)}= g^{(UK+D)}$), the third apparatus may send the encrypted data ED obtained by encrypting the will of the father to the second apparatuses used by the mother, the eldest daughter, the eldest son.

The above has described the case where the information processing method according to the present embodiment is applied to the execution of a predetermined process by unanimous agreement between share-target users to which distribution keys are provided. The execution of the process as described above to which the information processing method according to the present embodiment is applied as described above makes it possible, for example, to disclose a highly confidential and important document on the basis of only agreement between all the relevant people.

It is to be noted that, in cases of the examples illustrated in FIGS. 13 and 14, the first apparatus and the third apparatus may be achieved as the same device. It is possible to flexibly modify the functional configuration of the information processing system 1 according to the present embodiment in accordance with a service to be applied.

1.6. Flow of Operation

Next, a flow of the operation of the information processing system 1 according to the embodiment of the present disclosure is described in detail.

A flow of the registration of encrypted data and an encrypted index by the information processing system 1 according to the present embodiment is first described. FIG. 15 is a sequence diagram illustrating a flow of the registration of encrypted data and an encrypted index according to the present embodiment.

Referring to FIG. 15, a user key manager 110a of the information processing terminal 10a corresponding to the first apparatus used by a share-source user first generates a user key (S1101). In addition, the user key manager 110a stores the user key generated in step S1101 in an internal storage or the like.

Next, an input unit 120a acquires data to be encrypted on the basis of an input operation by a user (S1103). In addition, the input unit 120a sends the data acquired in step S1102 to an encrypting unit 130a (S1104).

Furthermore, the user key manager 110a sends the user key stored in step S1102 to the encrypting unit 130a on the basis of a request or the like from the encrypting unit 130a.

Next, the encrypting unit 130a extracts a keyword from the data received in step S1104 (S1106).

In addition, the encrypting unit 130a encrypts the data received in step S1104 by using the user key received in step S1105 to generate encrypted data (S1107), and similarly encrypts the keyword extracted in step S1106 to generate an encrypted index (S1108).

Then, the encrypting unit 130a sends the encrypted data generated in step S1107 and the encrypted index generated in step S1108 through a communicating unit 170a to the information processing server 20 corresponding to the third apparatus (S1109).

Next, the data manager 220 of the information processing server 20 stores the encrypted data and the encrypted index received in step S1109 (S1110 and S1111).

The above has described a flow of the registration of encrypted data and an encrypted index according to the present embodiment. Next, a flow of the provision of a distribution key according to the present embodiment is described. FIG. 16 is a sequence diagram illustrating a flow of the provision of a distribution key according to the present embodiment.

Referring to FIG. 16, first, the user key manager 110a of the information processing terminal 10a corresponding to the first apparatus used by a share-source user sends the user key stored in step S1102 illustrated in FIG. 15 to a secret distribution processing unit 140a (S1201).

Next, the secret distribution processing unit 140a divides the user key received in step S1201 through a secret distribution process to generate two distribution keys (S1202).

Then, the secret distribution processing unit 140a provides one of the distribution keys generated in step S1202 to the information processing terminal 10b corresponding to the second apparatus through the communicating unit 170a (S1203).

A secret distribution processing unit 140b of the information processing terminal 10b stores the distribution key received in step S1203 (S1204).

In addition, the secret distribution processing unit 140a provides the other of the distribution keys generated in step S1202 to the information processing server 20 corresponding to the third apparatus through the communicating unit 170a (S1205).

The distribution key manager 210 of the information processing server 20 stores the distribution key received in step S1205 (S1206).

The above has described the flow of the provision of a distribution key according to the present embodiment. Next, a flow of the searching process according to the present embodiment is described. FIG. 17 is a sequence diagram illustrating a flow of the searching process according to the present embodiment.

Referring to FIG. 17, first, an input unit 120b of the information processing terminal 10b corresponding to the second apparatus acquires a search word on the basis of an input operation by a user (S1301). In addition, the input unit 120b sends the search word acquired in step S1301 to the encrypting unit 130 (S1302).

Next, the secret distribution processing unit 140b sends the distribution key stored in step S1204 illustrated in FIG. 16 to the encrypting unit 130 on the basis of a request or the like made by an encrypting unit 130b (S1303).

Next, the encrypting unit 130b performs homomorphic hash calculation based on the search word received in step S1302 and the distribution key received in step S1303 (S1304).

The encrypting unit 130b sends a hash value calculated in step S1304 to the information processing server 20 corresponding to the third apparatus through a communicating unit 170b (S1305).

Next, the distribution key manager 210 of the information processing server 20 sends the distribution key stored in step S1206 illustrated in FIG. 16 to the processing unit 230 on the basis of a request or the like made by the processing unit 230 that receives the hash value in step S1305 (S1306).

Next, the processing unit 230 performs hash calculation based on the hash value received in step S1305 and the distribution key received in step S1306 (S1307).

Then, the processing unit 230 makes a bit-matching determination between the hash value calculated in step S1307 and the encrypted index stored in step S1111 illustrated in FIG. 15 (S1308).

Here, in a case where it is determined that the search word is included in the encrypted index, the processing unit 230 sends a search result corresponding to the search word to the information processing terminal 10b (1309).

Next, a decrypting unit 150b of the information processing terminal 10b decrypts the search result received in step S1309 (S1310).

2. HARDWARE CONFIGURATION EXAMPLE

Next, a hardware configuration example shared between the information processing terminal 10 and the information processing server 20 according to the embodiment of the present disclosure is described. FIG. 18 is a block diagram illustrating a hardware configuration example of each of the information processing terminal 10 and the information processing server 20 according to the embodiment of the present disclosure. Referring to FIG. 18, the information processing server 20 includes, for example, a processor 871, ROM 872, RAM 873, a host bus 874, a bridge 875, an external bus 876, an interface 877, an input device 878, an output device 879, a storage 880, a drive 881, a coupling port 882, and a communication device 883. It is to be noted that the hardware configuration illustrated here is an example, and a portion of the components may be omitted. In addition, a component other than the components illustrated here may be further included.

(Processor 871)

The processor 871 functions, for example, as an arithmetic processing device or a control device, and controls the overall operation of each component or a portion thereof on the basis of a variety of programs recorded in the ROM 872, the RAM 873, the storage 880, or a removable recording medium 901.

(ROM 872 and RAM 873)

The ROM 872 is means for storing a program to be read by the processor 871, data to be used for calculation, or the like. The RAM 873 temporarily or permanently stores, for example, a program to be read by the processor 871, a variety of parameters appropriately changing in executing the program, or the like.

(Host Bus 874, Bridge 875, External Bus 876, and Interface 877)

The processor 871, the ROM 872, and the RAM 873 are coupled to each other, for example, through the host bus 874 that is able to transmit data at high speed. Meanwhile, the host bus 874 is coupled to the external bus 876 having a relatively low data transmission rate, for example, through the bridge 875. In addition, the external bus 876 is coupled to a variety of components through the interface 877.

(Input Device 878)

For example, a mouse, a keyboard, a touch panel, a button, a switch, a lever, and the like are used for the input device 878. Further, as the input device 878, a remote controller (referred to as a remote control below) is sometimes used that is able to transmit a control signal by using infrared rays or other radio waves. In addition, the input device 878 includes an audio input device such as a microphone.

(Output Device 879)

The output device 879 is a device that is able to visually or aurally notify a user of acquired information. Examples of the device include a display device such as CRT (Cathode Ray Tube), LCD, or organic EL, an audio output device such as a speaker or a headphone, a printer, a mobile phone, a facsimile, or the like. In addition, the output device 879 according to the present disclosure includes a variety of vibration devices that are able to output tactile stimulation.

(Storage 880)

The storage 880 is a device for storing various kinds of data. As the storage 880, for example, a magnetic storage device such as a hard disk drive (HDD), a semiconductor storage device, an optical storage device, a magneto-optical storage device, or the like is used.

(Drive 881)

The drive 881 is, for example, a device that reads out information recorded in the removable recording medium 901 such as a magnetic disk, an optical disc, a magneto-optical disk, or a semiconductor memory or writes information to the removable recording medium 901.

(Removable Recording Medium 901)

The removable recording medium 901 is, for example, a DVD medium, a Blu-ray (registered trademark) medium, an HD DVD medium, a variety of semiconductor storage media, or the like. Needless to say, the removable recording medium 901 may be, for example, an IC card, an electronic apparatus, or the like each of which is mounted with a contactless IC chip.

(Coupling Port 882)

The coupling port 882 is, for example, a port such as a USB (Universal Serial Bus) port, an IEEE 1394 port, SCSI (Small Computer System Interface), an RS-232C port, or an optical audio terminal for coupling an external coupling apparatus 902.

(External Coupling Apparatus 902)

The external coupling apparatus 902 is, for example, a printer, a portable music player, a digital camera, a digital video camera, an IC recorder, or the like.

(Communication Device 883)

The communication device 883 is a communication device for coupling to a network. The communication device 883 is, for example, a communication card for wired or wireless LAN, Bluetooth (registered trademark), or WUSB (Wireless USB), a router for optical communication, a router for ADSL (Asymmetric Digital Subscriber Line), a modem for various kinds of communication, or the like.

3. CONCLUSION

As described above, the information processing system that achieves the information processing method according to the embodiment of the present disclosure includes: the first apparatus that divides a user key of a share-source user through a secret distribution process to generate a plurality of distribution keys; the second apparatus that sends a processing request to execute a predetermined process by using one of the plurality of distribution keys generated by the first apparatus; and the third apparatus that makes a determination based on one of the plurality of distribution keys generated by the first apparatus and the processing request received from the second apparatus. Here, the first apparatus may provide respective distribution keys different from each other among the plurality of generated distribution keys to the second apparatus used by a share-target user and the third apparatus. In addition, the second apparatus may send, to the third apparatus, a hash value calculated through homomorphic hash calculation based on the received distribution key and input data. Furthermore, the third apparatus may compare a hash value calculated through homomorphic hash calculation based on the hash value received from the second apparatus and the distribution key received from the first apparatus with a hash value calculated through homomorphic hash calculation based on the above-described user key to determine whether or not to execute the predetermined process.

The configuration described above makes it possible to achieve a multi-user information search with a higher level of security.

A preferred embodiment(s) of the present disclosure has/have been described above in detail with reference to the accompanying drawings, but the technical scope of the present disclosure is not limited to such an embodiment(s). A person skilled in the art may find various alterations and modifications within the scope of the appended claims, and it should be understood that they will naturally come under the technical scope of the present disclosure.

In addition, the effects described herein are merely illustrative and exemplary, but not limitative. That is, the technology according to the present disclosure may exert other effects that are apparent to those skilled in the art from the description herein in addition to the above-described effects or in place of the above-described effects.

In addition, it is also possible to make a program for causing hardware such as CPU, ROM, and RAM built in a computer to exhibit a function equivalent to that of each component of the information processing terminal 10 or the information processing server 20. There may also be provided a computer-readable recording medium having the program recorded therein.

In addition, the respective steps for the processes of the information processing system 1 in this specification do not necessarily have to be performed in chronological order in accordance with the order illustrated in the sequence diagrams. For example, the respective steps for the processes of the information processing system 1 may be performed in order different from the order illustrated in the sequence diagrams, or may also be performed in parallel.

It is to be noted that the following configurations also fall within the technical scope of the present disclosure.

(1)

An information processing system including:

a first apparatus that divides a user key of a share-source user through a secret distribution process to generate a plurality of distribution keys;

a second apparatus that sends a processing request to execute a predetermined process by using one of a plurality of the distribution keys generated by the first apparatus; and a third apparatus that makes a determination based on one of a plurality of the distribution keys generated by the first apparatus and the processing request received from the second apparatus, in which the first apparatus provides the respective distribution keys different from each other among a plurality of the generated distribution keys to the second apparatus used by a share-target user and the third apparatus, the second apparatus sends a hash value to the third apparatus, the hash value being calculated through homomorphic hash calculation based on the received distribution key and input data, and the third apparatus compares a hash value calculated through homomorphic hash calculation based on the hash value received from the second apparatus and the distribution key received from the first apparatus with a hash value calculated through homomorphic hash calculation based on the user key to determine whether or not to execute the predetermined process.

(2)

The information processing system according to (1), in which the third apparatus executes the predetermined process in a case where the hash value calculated through the homomorphic hash calculation based on the hash value received from the second apparatus and the distribution key received from the first apparatus matches the hash value calculated through the homomorphic hash calculation based on the user key.

(3)

The information processing system according to (1), in which the predetermined process includes presenting a search result of encrypted data stored in the third apparatus, the second apparatus sends a hash value to the third apparatus, the hash value being calculated through homomorphic hash calculation based on the received distribution key and a search word, the third apparatus sends a search result corresponding to the search word to the second apparatus in a case where an encrypted index corresponding to the encrypted data includes the hash value received from the second apparatus, and the encrypted index includes a hash value calculated through homomorphic hash calculation based on a keyword list extracted from the encrypted data and the user key of the share-source user.

(4)

The information processing system according to (3), in which the search result includes at least any of the encrypted data including the search word or a list of the encrypted data including the search word.

(5)

The information processing system according to (3), in which the third apparatus sends re-encrypted data to the second apparatus as the search result, the re-encrypted data being obtained by re-encrypting the encrypted data by using proxy encryption.

(6)

The information processing system according to (5), in which the first apparatus receives a public key of the share-target user from the second apparatus that provides the distribution key, and sends a re-encryption key to the third apparatus, the re-encryption key being generated by using the public key and a secret key of the share-source user, the third apparatus sends the re-encrypted data to the second apparatus, the re-encrypted data being obtained by re-encrypting the encrypted data by using the received re-encryption key, and the second apparatus decrypts the received re-encrypted data by using a secret key of the share-target user.

(7)

The information processing system according to any of (3) to (6), in which the first apparatus sends the encrypted data and the encrypted index to the third apparatus, the encrypted index being generated through homomorphic hash calculation based on the keyword list extracted from the encrypted data and the user key of the share-source user.

(8)

The information processing system according to (7), in which the first apparatus generates the encrypted index obtained by encoding a hash value into a form of AMQ (Approximate Membership Query), the hash value being calculated through the homomorphic hash calculation based on the keyword list and the user key of the share-source user.

(9)

The information processing system according to (8), in which the form of AMQ includes at least a Bloom filter.

(10)

The information processing system according to any of (1) to (9), in which the third apparatus deletes the distribution key received from the first apparatus on the basis of a deletion request from the first apparatus.

(11)

The information processing system according to any of (1) to (10), in which the first apparatus generates the distribution keys through the secret distribution process, the distribution keys being greater in number than the share-target users by one.

(12)

The information processing system according to (11), in which the first apparatus provides the respective distribution keys different from each other to a plurality of the second apparatuses and the third apparatus, and the third apparatus compares hash values calculated sequentially by all a plurality of the second apparatuses through homomorphic hash calculation using the distribution keys with the hash value calculated through the homomorphic hash calculation based on the user key.

(13)

The information processing system according to (12), in which a plurality of the second apparatuses includes a starting-point terminal serving as a starting point of the processing request, and a passing terminal through which the processing request passes, the starting-point terminal sends the hash value to the passing terminal, the hash value being calculated through the homomorphic hash calculation based on the received distribution key and the input data, and the passing terminal sends a hash value calculated through homomorphic hash calculation based on the received distribution key and a hash value received from the starting-point terminal or the other passing terminal to the other passing terminal that has not performed the homomorphic hash calculation or the third apparatus.

(14)

The information processing system according to (13), in which, in a case where the other passing terminals that have not performed the homomorphic hash calculation exist, the passing terminal sends the hash value to one of the other passing terminals, and in a case where the other passing terminals that have not performed the homomorphic hash calculation do not exist, the passing terminal sends the calculated hash value to the third apparatus.

(15)

The information processing system according to any of (1) to (14), in which the predetermined process includes a settlement process, and the third apparatus executes the settlement process in a case where the hash value received from the second apparatus matches a hash value calculated through homomorphic hash calculation based on the user key and the input data.

(16)

The information processing system according to any of (1) to (15), in which the predetermined process includes a document disclosing process, and the third apparatus executes the document disclosing process in a case where the hash value received from the second apparatus matches a hash value calculated through homomorphic hash calculation based on the user key and the input data.

(17)

The information processing system according to any of (1) to (16), in which the third apparatus controls an interface for inputting the input data and displaying a result of the processing request.

(18)

An information processing method including:

dividing, by a first apparatus, a user key of a share-source user through a secret distribution process to generate a plurality of distribution keys;

sending, by a second apparatus, a processing request to execute a predetermined process by using one of a plurality of the distribution keys generated by the first apparatus; and making, by a third apparatus, a determination based on one of a plurality of the distribution keys generated by the first apparatus and the processing request received from the second apparatus, the information processing method further including providing, by the first apparatus, the respective distribution keys different from each other among a plurality of the generated distribution keys to the second apparatus used by a share-target user and the third apparatus, sending, by the second apparatus, a hash value to the third apparatus, the hash value being calculated through homomorphic hash calculation based on the received distribution key and input data, and comparing, by the third apparatus, a hash value calculated through homomorphic hash calculation based on the hash value received from the second apparatus and the distribution key received from the first apparatus with a hash value calculated through homomorphic hash calculation based on the user key to determine whether or not to execute the predetermined process.

(19)

An information processing apparatus including:

a secret distribution processing unit that divides a user key of a share-source user through a secret distribution process to generate a plurality of distribution keys; and a communicating unit that sends the respective distribution keys different from each other among a plurality of the distribution keys to a terminal used by a share-target user and a server that stores encrypted data.

(20)

The information processing apparatus according to (19), further including an encrypting unit that generates the encrypted data by using the user key, in which the communicating unit sends the encrypted data to the server, and the share-target user includes a user who is permitted by the share-source user to search the encrypted data.

REFERENCE SIGNS LIST

10 information processing terminal
110 user key manager
120 input unit
130 encrypting unit
140 secret distribution processing unit
150 decrypting unit
160 displaying unit
170 communicating unit
information processing server
210 distribution key manager
220 data manager
230 processing unit
240 terminal communicating unit

The invention claimed is:

1. An information processing system comprising:
a first apparatus that divides a user key of a share-source user through a secret distribution process to generate a plurality of distribution keys;
a second apparatus that sends a processing request to execute a predetermined process by using one of a plurality of the distribution keys generated by the first apparatus; and
a third apparatus that makes a determination based on one of a plurality of the distribution keys generated by the first apparatus and the processing request received from the second apparatus, wherein
the first apparatus provides the respective distribution keys different from each other among a plurality of the generated distribution keys to the second apparatus used by a share-target user and the third apparatus,
the second apparatus sends a hash value to the third apparatus, the hash value being calculated through homomorphic hash calculation based on the received distribution key and input data, and
the third apparatus compares a hash value calculated through homomorphic hash calculation based on the hash value received from the second apparatus and the distribution key received from the first apparatus with a hash value calculated through homomorphic hash calculation based on the user key to determine whether or not to execute the predetermined process.

2. The information processing system according to claim 1, wherein the third apparatus executes the predetermined process in a case where the hash value calculated through the homomorphic hash calculation based on the hash value received from the second apparatus and the distribution key received from the first apparatus matches the hash value calculated through the homomorphic hash calculation based on the user key.

3. The information processing system according to claim 1, wherein the predetermined process includes presenting a search result of encrypted data stored in the third apparatus,
the second apparatus sends a hash value to the third apparatus, the hash value being calculated through homomorphic hash calculation based on the received distribution key and a search word,
the third apparatus sends a search result corresponding to the search word to the second apparatus in a case where an encrypted index corresponding to the encrypted data includes the hash value received from the second apparatus, and
the encrypted index includes a hash value calculated through homomorphic hash calculation based on a keyword list extracted from the encrypted data and the user key of the share-source user.

4. The information processing system according to claim 3, wherein the search result includes at least any of the encrypted data including the search word or a list of the encrypted data including the search word.

5. The information processing system according to claim 3, wherein the third apparatus sends re-encrypted data to the second apparatus as the search result, the re-encrypted data being obtained by re-encrypting the encrypted data by using proxy encryption.

6. The information processing system according to claim 5, wherein
the first apparatus receives a public key of the share-target user from the second apparatus that provides the distribution key, and sends a re-encryption key to the third apparatus, the re-encryption key being generated by using the public key and a secret key of the share-source user,
the third apparatus sends the re-encrypted data to the second apparatus, the re-encrypted data being obtained by re-encrypting the encrypted data by using the received re-encryption key, and
the second apparatus decrypts the received re-encrypted data by using a secret key of the share-target user.

7. The information processing system according to claim 3, wherein the first apparatus sends the encrypted data and the encrypted index to the third apparatus, the encrypted index being generated through homomorphic hash calculation based on the keyword list extracted from the encrypted data and the user key of the share-source user.

8. The information processing system according to claim 7, wherein the first apparatus generates the encrypted index obtained by encoding a hash value into a form of AMQ (Approximate Membership Query), the hash value being calculated through the homomorphic hash calculation based on the keyword list and the user key of the share-source user.

9. The information processing system according to claim 8, wherein the form of AMQ includes at least a Bloom filter.

10. The information processing system according to claim 1, wherein the third apparatus deletes the distribution key received from the first apparatus on a basis of a deletion request from the first apparatus.

11. The information processing system according to claim 1, wherein the first apparatus generates the distribution keys through the secret distribution process, the distribution keys being greater in number than the share-target users by one.

12. The information processing system according to claim 11, wherein
the first apparatus provides the respective distribution keys different from each other to a plurality of the second apparatuses and the third apparatus, and
the third apparatus compares hash values calculated sequentially by all a plurality of second apparatuses through homomorphic hash calculation using the distribution keys with the hash value calculated through the homomorphic hash calculation based on the user key.

13. The information processing system according to claim 12, wherein
a plurality of the second apparatuses includes a starting-point terminal serving as a starting point of the processing request, and a passing terminal through which the processing request passes,
the starting-point terminal sends the hash value to the passing terminal, the hash value being calculated through the homomorphic hash calculation based on the received distribution key and the input data, and
the passing terminal sends a hash value calculated through homomorphic hash calculation based on the received distribution key and a hash value received from the starting-point terminal or from one or more other passing terminals to at least one other passing terminal that has not performed the homomorphic hash calculation or to the third apparatus.

14. The information processing system according to claim 13, wherein, in a case where the at least one other passing terminal that has not performed the homomorphic hash calculation exists, the passing terminal sends the hash value to the at least one other passing terminal, and in a case where there are no other passing terminals that have not performed the homomorphic hash calculation, the passing terminal sends the calculated hash value to the third apparatus.

15. The information processing system according to claim 1, wherein
the predetermined process includes a settlement process, and
the third apparatus executes the settlement process in a case where the hash value received from the second apparatus matches a hash value calculated through homomorphic hash calculation based on the user key and the input data.

16. The information processing system according to claim 1, wherein
the predetermined process includes a document disclosing process, and
the third apparatus executes the document disclosing process in a case where the hash value received from the second apparatus matches a hash value calculated through homomorphic hash calculation based on the user key and the input data.

17. The information processing system according to claim 1, wherein the third apparatus controls an interface for inputting the input data and displaying a result of the processing request.

18. An information processing method comprising:
dividing, by a first apparatus, a user key of a share-source user through a secret distribution process to generate a plurality of distribution keys;
sending, by a second apparatus, a processing request to execute a predetermined process by using one of a plurality of the distribution keys generated by the first apparatus; and
making, by a third apparatus, a determination based on one of a plurality of the distribution keys generated by the first apparatus and the processing request received from the second apparatus, the information processing method further including
providing, by the first apparatus, the respective distribution keys different from each other among a plurality of the generated distribution keys to the second apparatus used by a share-target user and the third apparatus,
sending, by the second apparatus, a hash value to the third apparatus, the hash value being calculated through homomorphic hash calculation based on the received distribution key and input data, and
comparing, by the third apparatus, a hash value calculated through homomorphic hash calculation based on the hash value received from the second apparatus and the distribution key received from the first apparatus with a hash value calculated through homomorphic hash calculation based on the user key to determine whether or not to execute the predetermined process.

19. An information processing apparatus comprising:
a secret distribution processing unit configured to divide a user key of a share-source user through a secret distribution process to generate a plurality of distribution keys; and
a communicating unit configured to
send one or more first distribution keys of the plurality of the distribution keys to a terminal used by a share-target user, and
send one or more second distribution keys of the plurality of the distribution keys to a server configured to store encrypted data,
wherein the one or more first distribution keys and the one or more second distribution keys are different from each other,
wherein the server is configured to compare a hash value calculated through homomorphic hash calculation based on the one or more first distribution keys with a hash value calculated through homomorphic hash calculation based on the one or more second distribution keys to determine whether or not to execute a process, and
wherein the secret distribution processing unit and the communicating unit are each implemented via at least one processor.

20. The information processing apparatus according to claim 19, further comprising
an encrypting unit configured to generate the encrypted data by using the user key,
wherein the communicating unit is further configured to send the encrypted data to the server,
wherein the share-target user includes a user who is permitted by the share-source user to search the encrypted data, and
wherein the encrypting unit is implemented via at least one processor.

* * * * *